United States Patent
Shimizu et al.

[19]
[11] Patent Number: 6,153,971
[45] Date of Patent: Nov. 28, 2000

[54] LIGHT SOURCE WITH ONLY TWO MAJOR LIGHT EMITTING BANDS

[75] Inventors: Masanori Shimizu, Kyoto; Yasuhiko Yamanaka; Syouetsu Sakamoto, both of Hirakata; Tetsuji Takeuchi, Kyoto, all of Japan

[73] Assignee: Matsushita Electric Industrial Co., Ltd., Osaka, Japan

[21] Appl. No.: 09/329,419

[22] Filed: Jun. 10, 1999

Related U.S. Application Data

[62] Division of application No. 08/836,842, Aug. 4, 1997.

[30] Foreign Application Priority Data

Sep. 21, 1995 [JP] Japan ................................ 7-242863

[51] Int. Cl.[7] .............................. H01J 1/62; H01J 63/04
[52] U.S. Cl. ..................... 313/486; 313/485; 313/487; 252/301.4 P; 362/230; 362/231
[58] Field of Search ........................ 313/485, 486, 313/487, 503; 252/301.4 R, 301.4 P, 301.4 H; 362/230, 231

[56] References Cited

U.S. PATENT DOCUMENTS

| | | | |
|---|---|---|---|
| 3,602,758 | 8/1971 | Thornton et al. | 313/109 |
| 4,038,204 | 7/1977 | Wachte | 252/301.4 P |
| 4,075,532 | 2/1978 | Piper et al. | 252/301.4 P |
| 4,079,287 | 3/1978 | Soules et al. . | |
| 4,176,294 | 11/1979 | Thornton, Jr. | 313/487 |
| 4,199,707 | 4/1980 | Akiyama et al. | 313/487 |
| 4,825,127 | 4/1989 | Krasko et al. | 313/486 |
| 5,049,779 | 9/1991 | Itsuki et al. | 313/486 |
| 5,105,122 | 4/1992 | Konnigs et al. | 313/487 |
| 5,539,276 | 7/1996 | Exell et al. | 313/486 |
| 5,602,445 | 2/1997 | Solanki et al. | 313/503 |
| 5,714,835 | 2/1998 | Zachau et al. | 313/486 |
| 5,714,836 | 2/1998 | Hunt et al. | 313/487 |
| 5,770,917 | 6/1998 | Yano et al. | 313/486 |
| 5,838,101 | 11/1998 | Pappalardo | 313/487 |
| 5,859,496 | 1/1999 | Murazaki et al. | 313/485 |
| 5,998,925 | 12/1999 | Shimizu et al. | 313/503 |

FOREIGN PATENT DOCUMENTS

| | | |
|---|---|---|
| 0 552 513 | 7/1993 | European Pat. Off. . |
| 58-225552 | 12/1983 | Japan . |
| 60-89061 | 5/1985 | Japan . |
| 64-2246 | 1/1989 | Japan . |
| 2-256153 | 10/1990 | Japan . |
| 7-94146 | 4/1995 | Japan . |

OTHER PUBLICATIONS

Bridget Travers, The Gale Encyclopedia of Science, vol. 3, p. 1506.

"Fluorescent Material Handbook", Compiled by Fluorescent Material Academy, Ed. 1, Ohm Pub. Ltd., Dec. 25, 1987.

Japanese Official Action for Patent Appln. Hei 9–512584 dated Jun. 8, 1999 with English translation.

Search Report for counterpart Singapore Appln No. 9702562–1 dated Jun. 8, 1999 (conducted by the Australian Patent Office).

Ivey, Henry F., "Color and Efficiency of Fluorescent and Fluroescent–Mercury Lamps", Journal of the Optical Society of America, vol. 62, No. 6, (1972) pp. 814–822.

Boynton, Robert M. and Olson, Conrad X., "Locating Basic Colors in the OSA Space", Color Res. & Appl., vol. 12,. No. 2 (1987) pp. 94–105.

(List continued on next page.)

*Primary Examiner*—Michael H. Day
*Assistant Examiner*—Mariceli Santiago
*Attorney, Agent, or Firm*—Ratner & Prestia

[57] ABSTRACT

A light source for categorical color perception has major light emitting bands in ranges from 530 to 580 and from 600 to 650, with correlated color temperature of the lamp light color in a range from 1700 to 6500 and with DUV (distance from perfect radiator locus on UV coordinates) in a range from 0 to 70, and allows categorical perception of at least red, green, blue, yellow and white of surface colors of an illuminated object.

17 Claims, 25 Drawing Sheets

OTHER PUBLICATIONS

Uchikawa, K. and Boynton, R.M., "Categorical Color Perception of Japanese Observers: Comparison With That of Americans", Vision Res., vol. 27, No. 10, (1987) pp. 1825–1833.

European Search Report corresponding to Patent Application No. 96930384.1 dated Oct. 2, 1997.

International Search Report corresponding to PCT/JP96/02618 dated Jan. 28, 1997.

Einhorn et al., "Inherent Efficiency And Colour Rendering of White Light Sources", Illuminating pp. 154–158, Mar. 1967.

Commission Internationale de l'Eclairage: Review of the Official Recommendations of the CIE for the Colours of Signal Lights, CIE Technical Report CIE107–1994.

W. G. Pracejus, "Preliminary Report on a New Approach to Color Acceptance Studies", Illuminating Engineering, (Dec. 1967), pp. 663–673.

Boynton, R. M., Fargo, Lee, Collins, Belinda L., "Categorical Color Rendering of Four Common Light Sources", Color Research and Application, vol. 15, No. 4., (1990), pp. 222–230.

Pearson, D.E., and Rubinstein, C. B., "Range of Perceived Hues in Two–Primary Projections," Journal of the Optical Society of America, vol. 60, No. 10, (1970), pp. 1398–1403.

"Road Traffic Sign Handbook" edited by Japan Contractors Association of Traffic Signs and Line Markings, supervised by the Minstry of Construction, Road Bureau and National Police Agency, Traffic Bureau. (English language annotation provided) (Oct. 20, 1998).

"Road Surface Sign Handbook" edited by Japan Contractos Association of Traffic Signs and Line Markings, supervised by the Minstry of Construction, Road Bureau and National Police Agency, Traffic Bureau. (English language annotation provided) (Jul. 15, 1983).

Boundaries for colours of signal lights currently recommended by the CIE
(Colors of Signal Lights CIE Publication 2.2-1975)

LIGHT SOURCE WITH ONLY TWO MAJOR LIGHT EMITTING BANDS

This application is a division of U.S. patent application Ser. No. 08/836,842, filed Aug. 4, 1997, now allowed.

FIELD OF THE ART

The present invention relates to a light source for providing illumination with high efficiency while ensuring the minimum necessary level of color reproduction.

BACKGROUND ART

A light source generally known to have a high efficiency is the low pressure sodium lamp. It has the highest luminous efficiency among artificial light sources which are commonly used, and attains a total efficiency of 1091 m/W with a lamp having output power of 55 W. However, most of emission form the low pressure sodium lamp is concentrated in an emission line of 589 nm called D-line, namely monochromatic light of orange-yellowish color, which disables it to distinguish different colors.

Meanwhile, a three band radiation type fluorescent lamp has been developed as a high-efficiency light source capable of good reproduction of colors by concentrating the light in the visible radiation band into red (R), green (G) and blue (B).

Simulation has been conducted to verify the possibility of a light source which has a luminous efficiency higher than that of a light source which has an emission spectrum of three band radiation type, and has some degree of color rendering properties, by means of radiation spectrum of dual band radiation type where light of visible radiation band is concentrated into two wavelength bands.

Simulation for optimization of light source of dual band radiation type of the prior art is reported in literature such as H. D. Einhorn and F. D. Einhorn "Inherent Efficiency and Colour Rendering of White Light Sources", Illuminating Engineering, P154, March 1967 and H. F. Ivey "Color and Efficiency of Fluorescent and Fluorescent-Mercury Lamps", Journal of the Optical Society of America, Vol. 62, No. 6, P814, 1972.

These works conducted numerical simulation of dual-wavelength optimization based on the approximation of spectral distribution of phosphor by the Gaussian distribution and on such a concept of color rendering properties as evaluating, in terms of color difference, the general color rendering index Ra of the prior art, namely the color shift between the appearance of color of a color chip illuminated by a reference light source and the appearance of color of a color chip illuminated by a light source.

As a result, mixture of blue spectrum near 450 nm and yellow spectrum near 580 nm has been considered to be a white light source that shows the highest efficiency with respect to the optimization of dual band radiation type in terms of simulation. (Although a yellow and blue light source of dual band radiation type has been considered to be most desirable in the prior art from the view point of efficiency and Ra, now the yellow and blue light source of dual band radiation type described above is redefined as Y-B base light source of dual band radiation type from the view point of opponent-color response of human color vision, and a R-G base light source of dual band radiation type is newly defined based on a system of another opponent-color response.

However, when the efficiencies of phosphors in practical use are investigated, there is no phosphor having high efficiency among phosphors that emit at peak wavelengths corresponding to yellow and blue. In case of a phosphor of radiation spectrum approximated by the Gaussian distribution with quantum efficiency assumed to be constant over the entire wavelength range, simulation may indicate a high theoretical efficiency for the Y-B base light source of dual band radiation type but the emission from the actual phosphor or light source sometimes shows varying quantum efficiency or includes sub-wavelength of emission. Thus it is difficult to achieve the highest efficiency as predicted by simulation, and such a Y-B base light source of dual band radiation type has not been put in practical use.

Highest luminous efficiency can be achieved by concentrating the light in visible radiation band at one wavelength as in the case of the low pressure sodium lamp. In this case, however, because the radiation spectrum is a single line spectrum, color discrimination is impossible when illuminated with such a light source. Therefore, lamps having a very high efficiency but poor color rendering properties such as the low pressure sodium lamp are used in illumination of roads and road tunnels where emphasis is placed on efficiency.

While colors have the role of providing various information on the visual environment for humans, colors have a particularly great role among the visual information received by drivers of cars running on roads or in tunnels. For example, distinguishing lane marking white and yellow in a tunnel is very important to know whether lane changing is permitted or not. However, on roads and in tunnels which are illuminated by the low pressure sodium lamps, it has been difficult to distinguish the white and yellow lane markings on the road surface.

While colors used on traffic signs include red, yellow, green, blue, white and black on roads and in tunnels which are illuminated by the low pressure sodium lamps, it has been difficult to distinguish different colors of these signs (therefore traffic signs with built-in lamps are used in tunnels).

The important thing is that, the red of surface color be recognized red. Because red, in particular, which is coded for important meanings such as danger, prohibition, stop and fire fighting. Therefore important point in improving the visual environment from the view point of safety.

In case the Y-B base light source of dual band radiation type described previously is introduced in such a situation, there occurs such a problem that the probability of recognizing red which is an important color for the indication of danger is reduced due to the lack of spectrum at wavelengths 600 nm and longer.

In order to solve the problems of the prior art described above, the present invention has an objective of providing a practical light source which, when applied to road illumination or tunnel illumination, enables it to distinguish yellow and white road surface markings and to recognize the colors on road signs (particularly red) while maintaining a high efficiency, and enables color recognition at minimum necessary level in other applications, while maintaining a high efficiency.

To sum up, the invention intends to realize a light source that achieves a high efficiency while ensuring categorical recognition of colors at a minimum required level, while it is tried to improve the color rendering properties with a major objective aimed at exactly reproducing colors as represented by the general color rendering index Ra in the development of an illumination light source of the prior art.

DISCLOSURE OF INVENTION

A light source according to the invention has the following means for achieving the above objective.

A light source of the first present invention for categorical color perception has major light emitting bands in ranges from 530 to 580 nm and from 600 to 650 nm, with correlated color temperature of the lamp light color in a range from 1700 to 6500K and with DUV (distance from perfect radiator locus on UV coordinates) in a range from 0 to 70, which allows categorical perception of at least red, green, blue, yellow and white of surface colors of an illuminated object.

A light source of the second present invention is a fluorescent lamp for categorical color perception having major light emitting bands in ranges from 530 to 580 nm and from 600 to 650 nm, with correlated color temperature of the lamp light color in a range from 1700 to 6500K and with DUB in a range from 0 to 70, and allows categorical perception of at least red, green, blue, yellow and white of surface colors of an illuminated object.

A light source of the fifth present invention for lighting has the lamp light color being in a range of x-y chromaticity coordinates enclosed by (x, y)=a; (0.228, 0.351), b:(0.358, 0.551), c:(0.525, 0.440), d:(0.453, 0.440), e:(0.285, 0.332), which has major light emitting bands in ranges from 530 to 580 nm and from 600 to 650 nm.

A light source of the sixth present invention is a fluorescent lamp for lighting with the lamp light color being in a range of x-y chromaticity coordinates enclosed by (x, y)=a: (0.228, 0.351), b:(0.358, 0.551), c:(0.525, 0.453) and d:(0.285, 0.322), and has major light emitting bands in ranges from 530 to 580 nm and from 600 to 650 nm.

A light source of the seventh present invention for lighting has major light emitting bands in ranges from 530 to 580 nm and from 600 to 650 nm, with correlated color temperature of the lamp light color in a range from 3500 to 4500K and with DUV in a range from 10 to 45.

A light source of the eighth present invention is a fluorescent lamp for lighting having major light emitting bands of phosphor in ranges from 520 to 580 nm and from 600 to 650 nm, with correlated color temperature of the lamp light color in a range from 3500 to 4500K and with DUV in a range from 10 to 45.

DESCRIPTION OF NUMERALS

Figure 1:
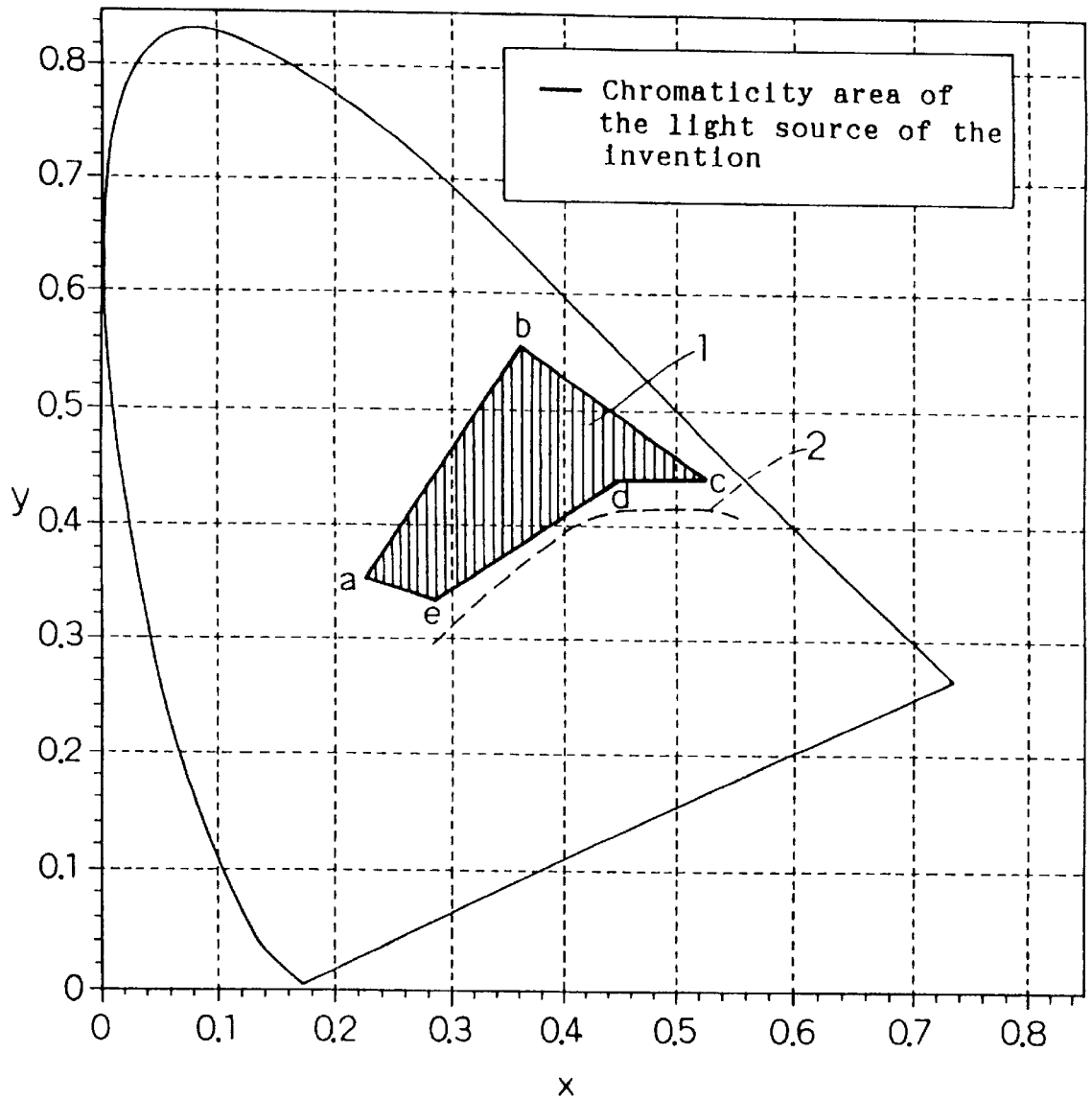
FIG. 1 shows the chromaticity range of the light source of the invention on x-y chromaticity coordinate plane.

1: Color range of light from the lamp of the invention
2: Plankian locus
3: Light from simulation light source in the case of LAP only
4: Light from simulation light source having flux ratio LAP:YOX of 93:7
5: Light from simulation light source having flux ratio LAP:YOX of 85:15
6: Light from simulation light source having flux ratio LAP:YOX of 76:24
7: Light from simulation light source having flux ratio LAP:YOX of 68:32
8: Light from simulation light source having flux ratio LAP:YOX of 43:57
9: Light from simulation light source in the case of YOX only
10: Light from simulation light source having correlated color temperature of 5576 [K] and DUB of 72.3
11: Light from simulation light source having correlated color temperature of 5158 [K] and DUV of 58.9
12: Light from simulation light source having correlated color temperature of 4467 [K] and DUB of 42.3
13: Light from simulation light source having correlated color temperature of 4219 [K] and DUB of 33.7

14: Light from simulation light source having correlated color temperature of 3866 [K] and DUB of 26.4
15: Light from simulation light source having correlated color temperature of 3392K and DUV of 16.3
16: Light from simulation light source having correlated color temperature of 3045K and DUV of 8.5
17: Light from simulation light source having correlated color temperature of 2538K and DUV of −0.3
18: Perspective view panel of road tunnel
19: Evaluation light source provides light from tunnel luminaire
20: Light source provides light for control the adaptation luminance
21: Observer
22: Prototype lamp having correlated color temperature of 5230K and DUV of 63
23: Prototype lamp having correlated color temperature of 4820K and DUV of 51
24: Prototype lamp having correlated color temperature of 4370K and DUV of 40
25: Prototype lamp having correlated color temperature of 3670K and DUV of 23
26: Prototype lamp having correlated color temperature of 3261K and DUB of 14
27: Schematic diagram of spectral distribution of the fourth embodiment
28: Schematic diagram of spectral distribution of the fifth embodiment
29: Schematic diagram of spectral distribution of the sixth embodiment
30: Schematic diagram of spectral distribution of the seventh embodiment.

MOST REFERRED EMBODIMENTS FOR REALIZING INVENTION

The entire disclosure of U.S. patent application Ser. No. 08/836,842, filed Aug. 4, 1987 is expressly incorporated by reference herein.

Outline of the invention will be described prior to specific embodiments.

The inventors found a wavelength band which enables it to distinguish colors of minimum required limits while increasing the luminous efficiency to make it higher than that of a light source having a radiation spectrum of three band radiation type, by creating a radiation spectrum of dual band radiation type where light of visible radiation band is concentrated in two wavelength bands.

This radiation spectrum is a combination of two bands of 530 to 580 nm and 600 to 650 nm, and the correlated color temperature of the resultant lamp light color is from 1700 to 6500K and DUV is from 0 to 70.

This makes it possible to recognize the color categories of at least red, green, blue, yellow and white, namely to achieve the minimum necessary level of categorical color perception while maintaining a high luminous efficiency. Also it is made possible to provide a light source which, when applied to road illumination or tunnel illumination, enables it to distinguish yellow and white road surface markings and to recognize the colors on traffic signs.

Firstly we explain about categorical color perception.

The human visual system has color discrimination capability to distinguish subtle difference in the color, as well as the capability to classify colors into large groups and categorically recognize colors. For example, it can recognize both dull red and sharp red in terms of representative concept of red by abstracting their common feature. A number of studies on the routine judgment of color recognition and color perception have revealed that the categorical color perception, as well as the capability of distinguishing slight color difference, is one of the basic functions of the human color perception.

Any developed language has color names for 11 common basic colors, suggesting the existence of categorical color perception which is invariable regardless of the human race (refer for example to Boynton, R. M. and Olson, C. X. "Locating basic colors in the OSA space", Color Res. Appl., Vol. 12 P94, 1987; and Uchikawa, K. and Boynton, R. M. "Categorical color perception of Japanese observers: Comparison with that of Americans", Vision Res. 27, P1825, 1987).

These 11 colors are red, green, yellow, blue, brown, orange, purple, pink, white, black and gray, which are divided into achromatic color terms (white, black and gray) and chromatic color terms (red, green, yellow, blue, brown, orange, purple and pink). The chromatic color terms are further divided into primary colors (red, green, yellow and blue) and secondary colors (brown, orange, purple and pink).

Among these 11 colors, most fundamental categories from the view point of lighting engineering are, in the group of chromatic color categories, red, green, yellow and blue which are components of opponent color response of color vision and are primary colors. This is because the other secondary colors are categories generated by the composite of the primary colors.

Representative category of achromatic colors is white from the view point of lighting engineering. This is because white directly and most strongly represents the spectral distribution of the light source. On the contrary, black absorbs light and therefore result sin constant category recognition in the practical domain. Therefore dark colors of achromatic color categories have lower importance compared to white. For these reasons, red, green, yellow, blue and white are selected here as the objects of the minimum required categorical color perception in the embodiment.

Now the concept of dual band radiation type will be described below.

There is a theory called Land's work on two-primary color projections which claims that most colors can be reproduced with the color stimuli of only two colors, even in the absence of the complete set of three primary colors of light namely red (R), green (G) and blue (B).

According to Land's Retinex theory, even in the absence of the complete set of the three primary colors of light, substantial number of colors can be reproduced by blending two colors (it may be interpreted that the color of nonexisting spectrum is perceived due to the induction effect, memory of color accompanying the recognition of the object identify and color contrast).

A human retina has three types of pyramidal cells, S, M and L, which have maximum sensitivity at short wavelengths (blue), medium wavelengths (green) and long wavelengths (red) in the visible radiation band, respectively. Outputs of these three photoreceptors are combined to be subject to intermediate processing in the retina as opponent-color responses of "yellow and blue" and "red and green" and eventually used in the categorical color recognition in the higher center of cerebrum.

For the purpose of creating a white light source by combining two stimuli of opponent colors, there can be the concept of R-G base dual radiation type light source according to this invention which stimulates mainly read and green receptors of the opponent-color response system of the visual sense, besides the concept of Y-B base dual band radiation type light source which stimulates mainly yellow and blue receptors of the opponent-color response system of the visual sense.

According to the invention, it has been found that a high-efficiency light source which enables it to distinguish colors at the minimum necessary level can be realized by concentrating the spectrum of light at two wavelengths which are mot appropriate for the illuminating light of R-G base dual band radiation type light source, in view of obtaining minimum necessary level of categorical color perception rather than the conventional evaluation by means of Ra.

Accordingly, with illumination light composed of two wavelengths, wavelength ranges of two wavelengths which allow minimum necessary level of categorical color perception of red, green, blue, yellow and white color chips are the combination of 530 to 580 [nm] and 600 to 650 [nm] described above.

Optimization of the Y-B base dual band radiation type light source of the prior art has been based on the optimization simulation of the dual band radiation type light source according to such a concept of color rendering properties as evaluating, in terms of color difference, the color shift between the appearance of color of a color chip illuminated by a reference light source and the appearance of color of a color chip illuminated by a light source. Optimization of the R-G base dual band radiation type light source according to the invention, on the other hand, is the result of optimization by categorical color perception based on actual human subjective category judgment on colors. This is a more practical concept for evaluating the requirements for practical use of light source which is required to allow the minimum necessary level of color discrimination with high efficiency, and is different from the prior art in the evaluation method itself.

In the case of the Y-B base dual band radiation type light source, important color of red which generally indicates danger must be reproduced by relying on the induction effect which as instability in color reproduction thus making a problem for application to actual illumination.

In the case of the R-G base dual band radiation type light source, on the contrary, red which generally indicates danger is perceived by means of the emission spectrum located at a wavelength longer than 600 nm without relying on the induction effect which has instability in color reproduction as in the case of the Y-B base dual band radiation type light source, and is therefore advantageous for the application to actual illumination.

When efficiencies of phosphors in practical use are investigated, there is a tendency that phosphors having dominant wavelengths in red and green regions have higher efficiencies than phosphors having dominant wavelengths in yellow and blue regions.

With phosphors of spectral distribution approximated by the Gaussian distribution and quantum efficiency assumed to be constant over the entire wavelength range, although simulation may indicate a higher theoretical efficiency for the Y-B base dual band radiation type light source, emission from the actual phosphor or light source includes sub-emission or the like and the maximum efficiency as indicated by the simulation is difficult to obtain. Further in the case of the R-G base dual band radiation type light source according to the invention, permissible range of emission in the band from 530 to 580 nm, where large part of the efficiency is gained when making a practical light source, is 0.85 or greater with unit value (1) assigned to 555 nm, when reference is made to the relative spectral luminous efficiency, which is relatively wide where the visual efficiency is high, thereby offering broad choices for the materials to make a practical light source.

Thus however high theoretical efficiency the Y-B base dual band radiation type light source may have, the R-G base dual band radiation type light source has greater advantage in terms of practical viability.

The invention has another advantage of being capable of increasing the proportion of emission in a band from 530 to 580 nm where visual efficiency is higher, because the correlated color temperature of the lamp light color is in the range from 1700 to 6500K and DUV is from 0 to 70, and therefore permissible range of light color is wider on green side of the Plankian locus.

Note here that a correlated color temperature below 1700K makes it impossible to obtain categorical color perception of white, and a correlated color temperature being set above 6500K makes it necessary to increase the proportion of spectrum component of bluish light, thereby canceling the merit of high efficiency in practical use and nullifying the difference from the conventional three band radiation type light source.

Therefore, combination of emission spectra in a wavelength region which enables categorical color perception of the minimum necessary level while achieving an emission efficiency higher than that of a light source which has three band radiation type emission spectrum is, for a lamp with emission spectrum of dual band radiation type, the combination of emission spectra in two bands of from 530 to 580 nm and from 600 to 650 nm with correlated color temperature of the lamp light color in the range from 1700 to 6500K and DUV from 0 to 70.

As described above, it can be said that the R-G base dual band radiation type light source is better in total practical utility than the Y-B base dual band radiation type light source in terms of practical visibility requirement and practical viability. Hereafter limitation on the chromaticity range of the light source of the invention will be described below with reference to the accompanying drawings.

FIG. 1 shows the chromaticity range of the light source of the invention on x-y chromaticity coordinate plane. The range enclosed by the solid line 1 in the drawing is the range of lamp light color of the invention , (x, y)=a: (1.228, 0.351), b:(0.358, 0.551), c:(0.525, 0.440), d:(0.453, 0.440), e:(0.285, 0.332).

Line from (a) to (b) is the boundary with safety light color of green, line from b to c is anomalous color vision confusion line of people having anomalous color vision, and line from c to e is the limitation of the chromaticity range used in ordinary white light sources on the positive side of DUV.

Broken line 2 is the Plankian locus. It is known that the efficiency of a lamp generally becomes higher when the light color of lamp is shifted from the Plankian locus 2 upward to an area where DUV is positive, but it is said that excessive shifting of DUV decreases the value of Ra and makes exact color reproduction impossible, thus making such an application impractical.

However, there is such needs as the highest priority is placed on the use of high-efficient light source and that it will suffice to be capable of categorical recognition of safety colors at the minimum necessary level in such cases as tunnel illumination and road illumination.

In such a case, provided that the visual system can chromatic adaptation to the light color, it becomes possible to accept, as the light source color, portions away from the chromaticity range of light source which has conventionally been accepted as the light source of ordinary use based on the requirement of exact color reproduction.

Chromaticity nearer to the Plankian locus 2 lead to improved color rendering, but results in decreased lamp efficiency. For this reason, limitation range of white light source near the Plankian locus and limitation range of chromatic light source near the spectrum locus were set from the range of signal color light of CIE shown in FIG. 2. (Commission Internationale de l'Eclairage: Review of the Official Recommendations of the CIE for the Colours of Signal Lights, CIE Technical Report CIE107-1994)

Figure 2:
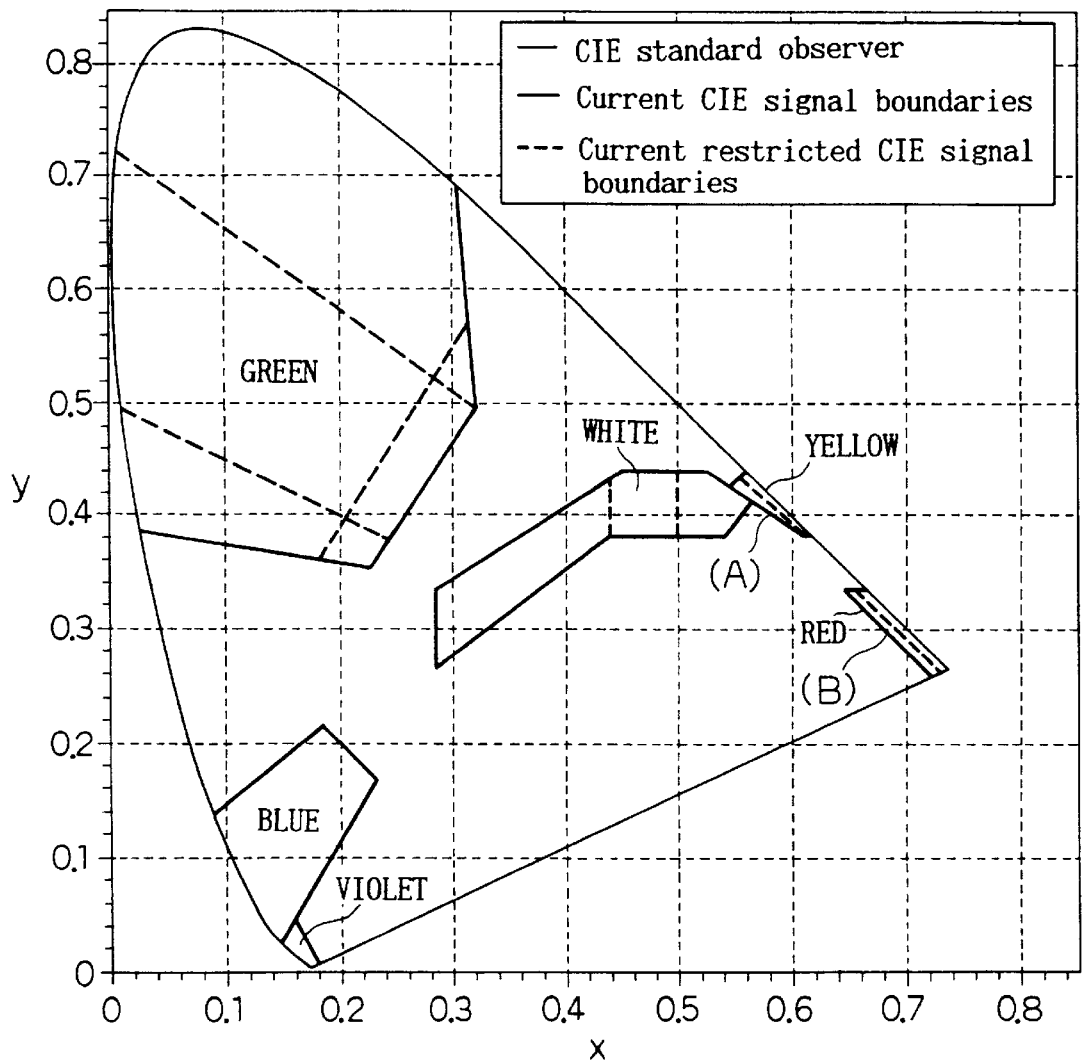
FIG. 2 shows the chromaticity range of signal color light according to CIE.

The limitation of color of the light source of the invention on green side, in contrast to the range of signal light color of FIG. 2, sets the light color of the invention on white side of the extended line of the white boundary of green, and therefore clearly defines the separation from the safety color of "green". Also because the light color of the invention is set on white side of the extended line of the white boundary of yellow (A) and red (B), the light color of the invention no longer rides on the confusion line with yellow and red anomalous color vision. This makes it easier for people having anomalous color vision to distinguish important signal light colors of red and yellow from the light source of the invention.

It can be said that the area enclosed by the Plankian locus and the areas of these signal light colors is the are where confusion with the chromatic light is less likely and efficient categorical discrimination of a plurality of basic color names is made possible.

Even when an area extended toward positive values of DUV from the light color white, which have conventionally been evaluated in terms of accuracy of color rendering and accepted as the ordinary white light source, is accepted as the illumination light, this area becomes the area where a light source which allows categorical color perception with higher efficiency than the conventional light source, because colors of high saturation which are used in coding of colors such as safety colors can be distinguished categorically.

Figure 3:
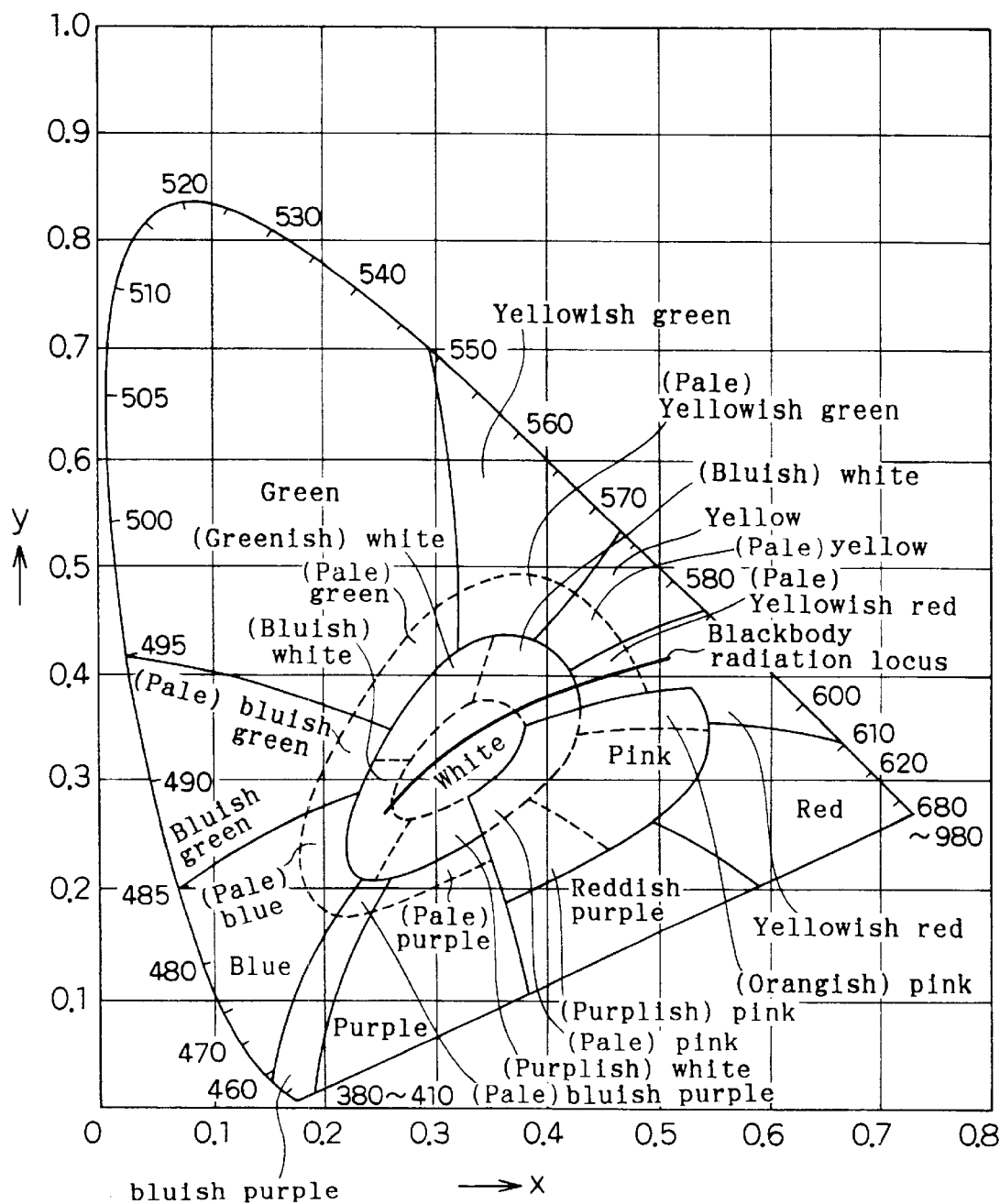
FIG. 3 shows the color naming of light-source colors.

When the efficiency and incongruity as the visual environment are taken into consideration, the lights with the color areas of pale yellow and pale yellowish green shown in FIG. 3 are preferable, followed by yellow, yellowish green, greenish white, pale green, and the areas of yellowish white, white, pale yellowish red and yellowish red above the Plankian locus.

This area has a configuration similar to the chromaticity range of the invention on the x-y chromaticity coordinate plane.

From the above discussion, it will be seen that the invention is intended to put the light source of the chromaticity range which is not found in the conventional white light source in practical use.

According to the invention, high-efficient light source can be realized while maintaining minimum necessary level of categorical color perception of a plurality of basic colors by setting the range of principal emission wavelengths in the band from 530 to 580 nm to improve the visual efficiency with weak sub-emission in other visible radiation region, while deviating from the chromaticity range of the ordinary illumination lights of the prior art. It is possible to enable categorical color perception of a plurality of basic colors including red more efficiency by further concentrating the emission outside the band from 530 to 580 nm into the band from 600 to 650 nm.

Now preferred embodiments of the invention will be described with reference to the accompanying drawings.

In a fluorescent type High Intensity Discharge Lamp in general, emission by electric discharge and the fluorescent emission are controlled, while in an High Intensity Discharge lamp the emission by electric discharge is controlled by selecting the sealed materials.

Figure 4:
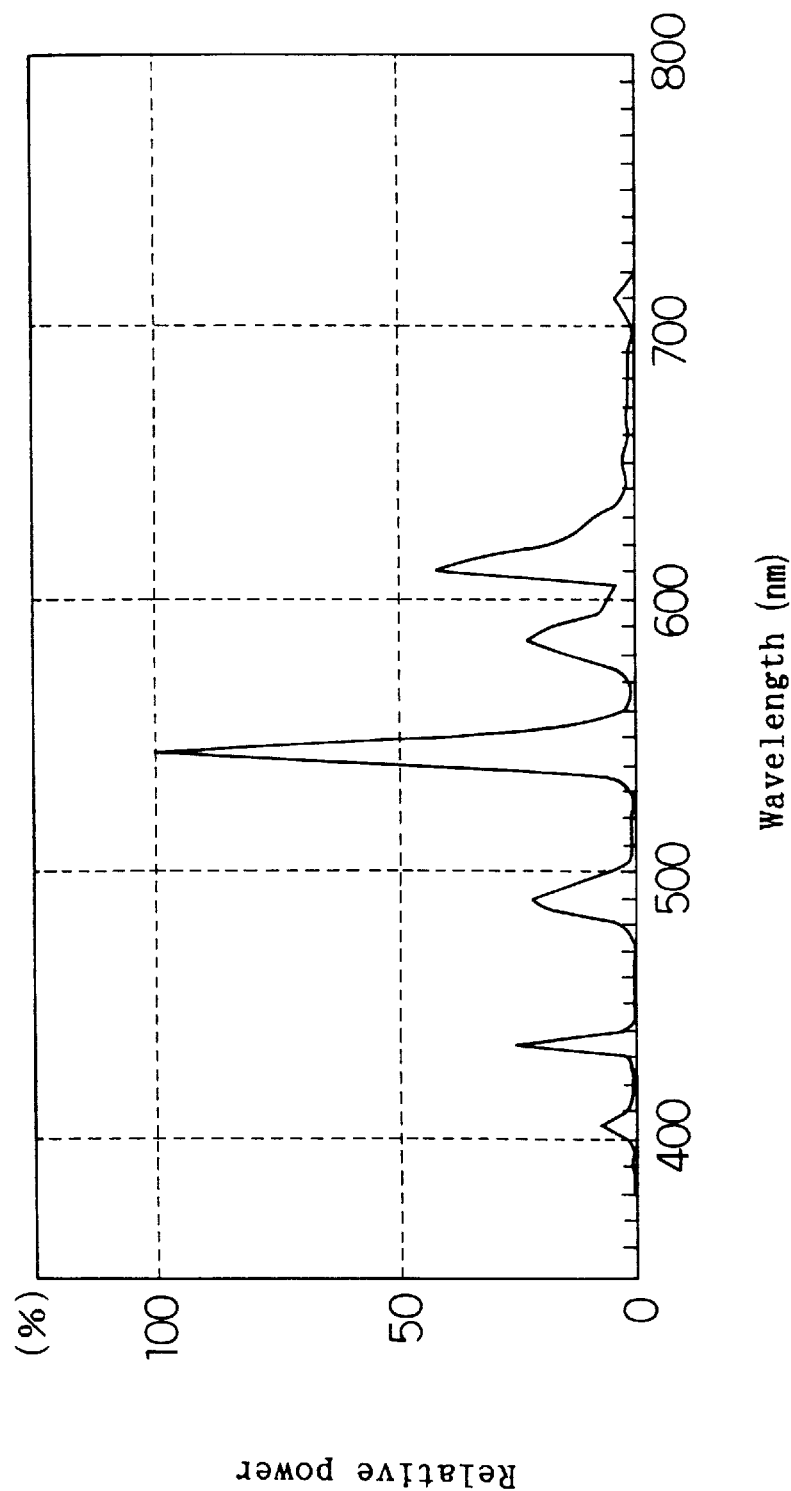
FIG. 4 shows a spectral distribution of a fluorescent lamp according to a first embodiment of the invention.

First embodiment of the invention is a fluorescent lamp having spectral distribution shown in FIG. 4.

The fluorescent lamp is made by using green practical phosphor which is commonly used and identified as [Chemical formula 1] LaPO4: Ce, Tb (called LAP hereafter) and red practical phosphor which is commonly used and identified as [Chemical formula 2] Y2O3: Eu (called YOX hereafter). In the form of a straight tube with 40 W output, the fluorescent lamp has a total efficiency of 87 lm/w and, when the tube diameter is reduced for high frequency operation and operated at a high frequency, can operate with a total efficiency of 110 lm/w.

This figure surpasses the total efficiency 109 lm/w of a 55 W type low pressure sodium lamp which is said to have the highest efficiency. However, LPS emits monochromatic light. Therefore, only monochromatic color can be seen under the LPS (Low Pressure Sodium Lamp). the fluorescent lamp is realized by this invention epoch making as a practical light source which allows categorical color perception of minimum necessary level.

11 color categories which make the basis for categorical color perception are red, green, yellow, blue, brown, orange, purple, pink, white, black and gray. Among these, most basic categories are red, green, yellow and blue for chromatic components, and white for achromatic component. This is because white directly reflects the spectral distribution of the light source. On the contrary, because black absorbs light, it results in constant category recognition in the practical domain regardless of changes in the spectral distribution. Therefore black has lower importance than white. For these reasons, red, green, yellow, blue and white are selected as the objects of the minimum required categorical color perception in this embodiment.

For the purpose of lighting engineering, color chips used for evaluation must be chosen. In this embodiment, safety colors, particularly traffic safety colors, are chosen as the representative color chips which must be recognized as minimum requirement for illumination environment.

According to the purpose of lighting color chips as objects of evaluation may also be chosen on the occasion of application in order to ensure minimum necessary level of perception of categorical color. It may also be possible to choose color chips used for evaluation of special color rendering, that is, R9 (red, R10 (yellow), R11 (green) and R12 (blue), or to choose other representative colors of the respective categories. However these colors are highly saturated colors and typical colors of category easy to recognize and therefore do not make much difference in the result.

In this embodiment, therefore, the traffic safety color chips described above are employed as the representatives which specify the minimum necessary level of categorical color perception, taking into consideration the situation of lighting applications where high efficiency is required despite poor color rendering properties.

According to the invention, such a range of wavelengths is found that enables minimum necessary level of categorical color perception in the radiation spectrum of dual band radiation type where light of visible radiation band is concentrated in two wavelength bands. This range is obtained by passing the light radiated from an incandescent lamp through a multi-interference membrane filter having half-width of 10 nm to extract various spectral wavelengths in the visible radiation band and checking combinations of two wavelengths among these systematically, thereby empirically determining a combination of spectral wavelengths which allow recognition of red, green, blue, yellow and white.

This experiments was conducted by employing the method of successive categories where sensory evaluation of color perception is made according to scale construction ranging from "good" to "poor" with "acceptable" as the median. Purpose of the method of successive categories is different from that of such criteria for evaluating the color rendering properties base don the color difference under reference light as represented by the general color rendering index Ra. Instead, categorical reproducibility of colors is evaluated according to the color rendering property evaluation technique which evaluates the acceptability of a color as the recognition of the color. (Such techniques of subjectively evaluating the acceptability are described and well known, for example, in W. G. Pracejus "Preliminary Report on a New Approach to Color Acceptance Studies", Illuminating Engineering, Vol. 62, P663, 1967 and R. M. Boynton, L. Fargo, B. L. Collins "Categorical Color Rendering of Four Common Light Sources", Color Research and Application, Vol. 15, No. 4, P222, 1990.)

The experimental method described above does not evaluate the perception of color of a light source on the basis of the accuracy of color reproduction, but evaluates the stability of categorical color perception mainly on the basis of the acceptance of color perception.

As a result, it was made possible to recognize the color of the color chips of red, green, blue, yellow and white under the illumination of light composed of two wavelengths, and a combination of wavelength bands which allowed minimum categorical color perception were the combination of 530 to 580 nm and 600 to 650 nm.

Further, illumination light of dual band radiation type which enables categorical color perception of the minimum necessary level while achieving an emission efficiency higher than that of a light source which has three band radiation type emission spectrum is the combination of emission spectra in two bands from 530 to 580 and from 600 to 650 nm wherein correlated color temperature of the lamp light color is in the range from 1700 to 6500 and DUV value is from 0 to 70.

This wavelength band is one wherein many light emitting materials with high luminous efficiencies emit light, and is of practical use. [Chemical formula 1] and [Chemical formula 2] of the first embodiment described previously are green and red light emitting components of the commonly used three band radiation type fluorescent lamp.

This enables practical use of a light source which allows categorical perception of colors, at least red, green, blue, yellow and white, namely the minimum necessary level of categorical color perception while maintaining a high luminous efficiency.

Further, when applied to road lighting or tunnel lighting, the invention provides a light source which allows discrimination of yellow and white line marking markings and enables it to distinguish the colors of traffic signs. Besides this embodiment, as described previously, color chips to be evaluated may be selected according to the particular application so that the minimum necessary perception can be assured.

Now color perception under the light source of this embodiment will be described below with reference to FIG. 5, FIG. 6, FIG. 7, FIG. 8, FIG. 9, FIG. 10 and FIG. 11.

FIG. 5 through FIG. 11 show spectral distributions simulated in the case of fluorescent lamps composed by changing the proportion of flux from LAP and YOX lamps in this embodiment. LAP and YOX used in this experiment are examples of phosphor which have peaks of emission in the bands from 530 to 580 nm and from 600 to 650 nm.

Proportion No. 3 (FIG. 5) is a case of LAP only with DUV value 75.

Proportion No. 4 (FIG. 6) is a case of flux ratio LAP:YOX of 93:7 with DUV value 60.

Proportion No. 5 (FIG. 7) is a case of flux ratio LAP:YOX of 85:15 with DUV value 43.

Proportion No. 6 (FIG. 9) is a case of flux ratio LAP:YOX of 76:24 with DUV value 27.

Proportion No. 7 (FIG. 9) is a case of flux ratio LAP:YOX of 68:32 with DUV value 14.

Proportion No. 8 (FIG. 10) is a case of flux ratio LAP:YOX of 43:57 with DUV value −11.

Proportion No. 9 (FIG. 11) is a case of YOX only with DUV value −25.

These simulated light sources were actually made by blending the light from LAP and YOX, and color perception with these simulated light sources was evaluated. The results will be described below with reference to FIG. 12, FIG. 13, FIG. 14 and FIG. 15.

Figure 12:
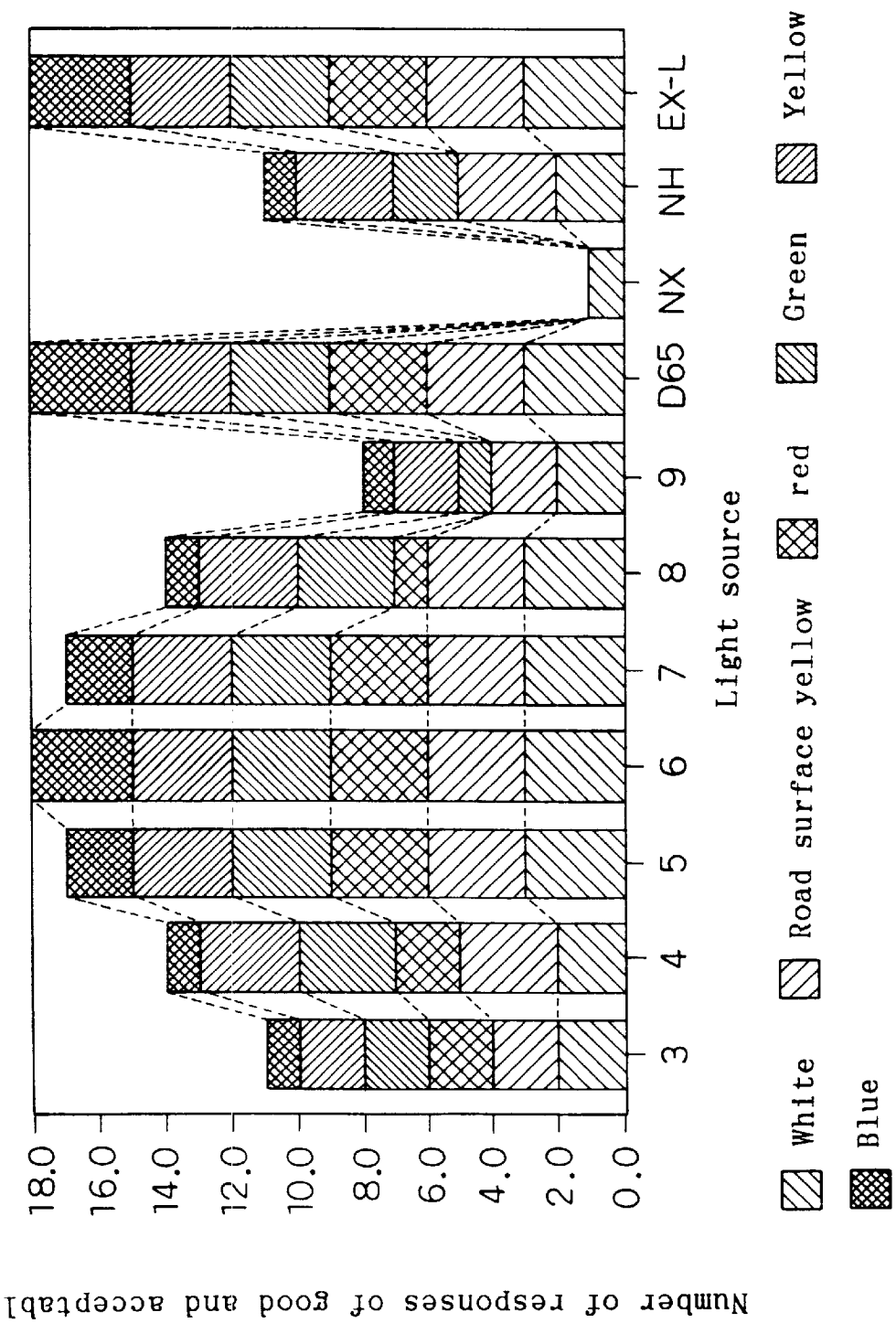
FIG. 12 shows the accumulated number of times categorical color rendering was evaluated as "good" and "acceptable".
Figure 13:
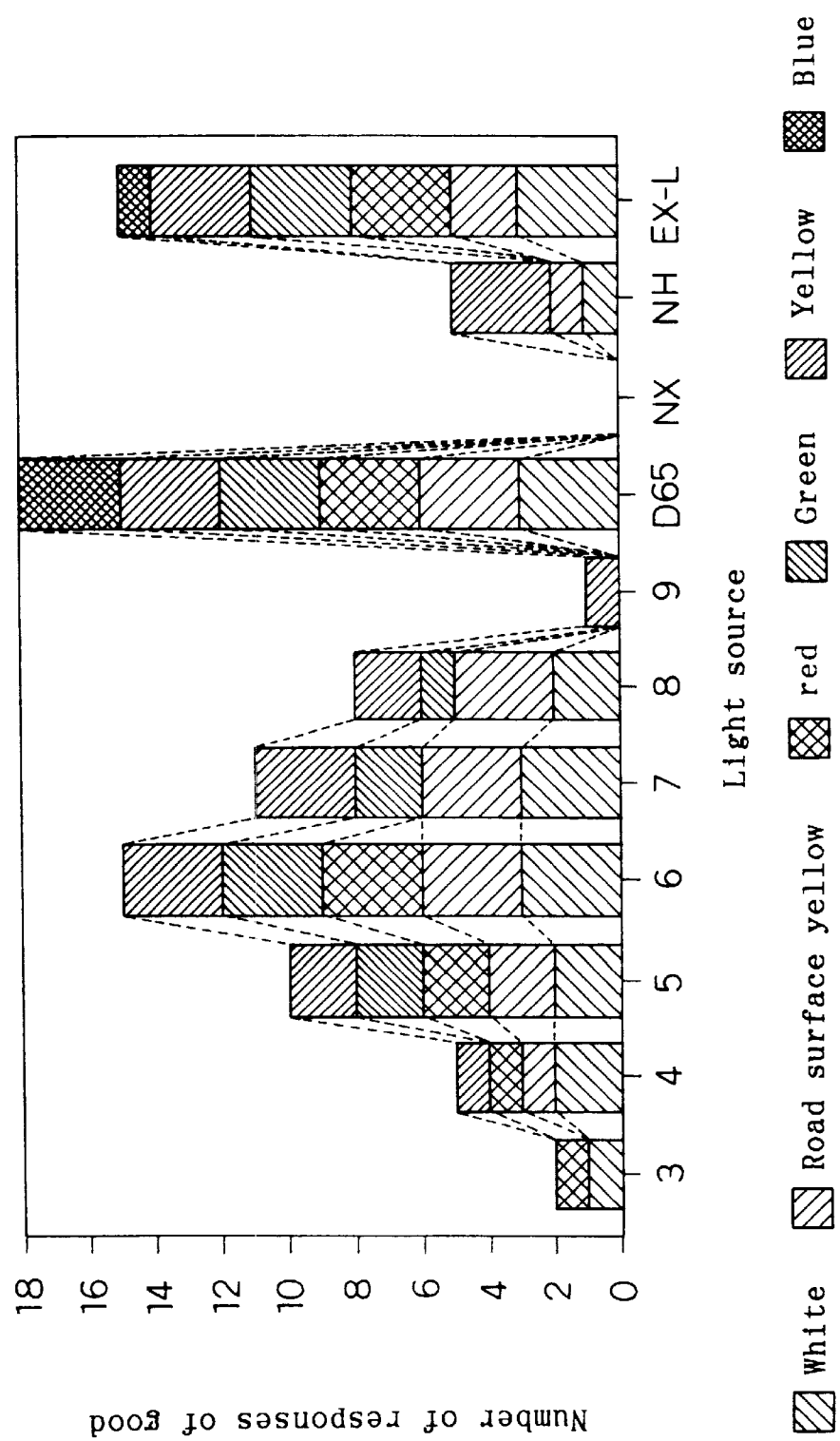
FIG. 13 shows the accumulated number of times categorical color rendering was evaluated as "good" for categorical color rendering.
Figure 14:
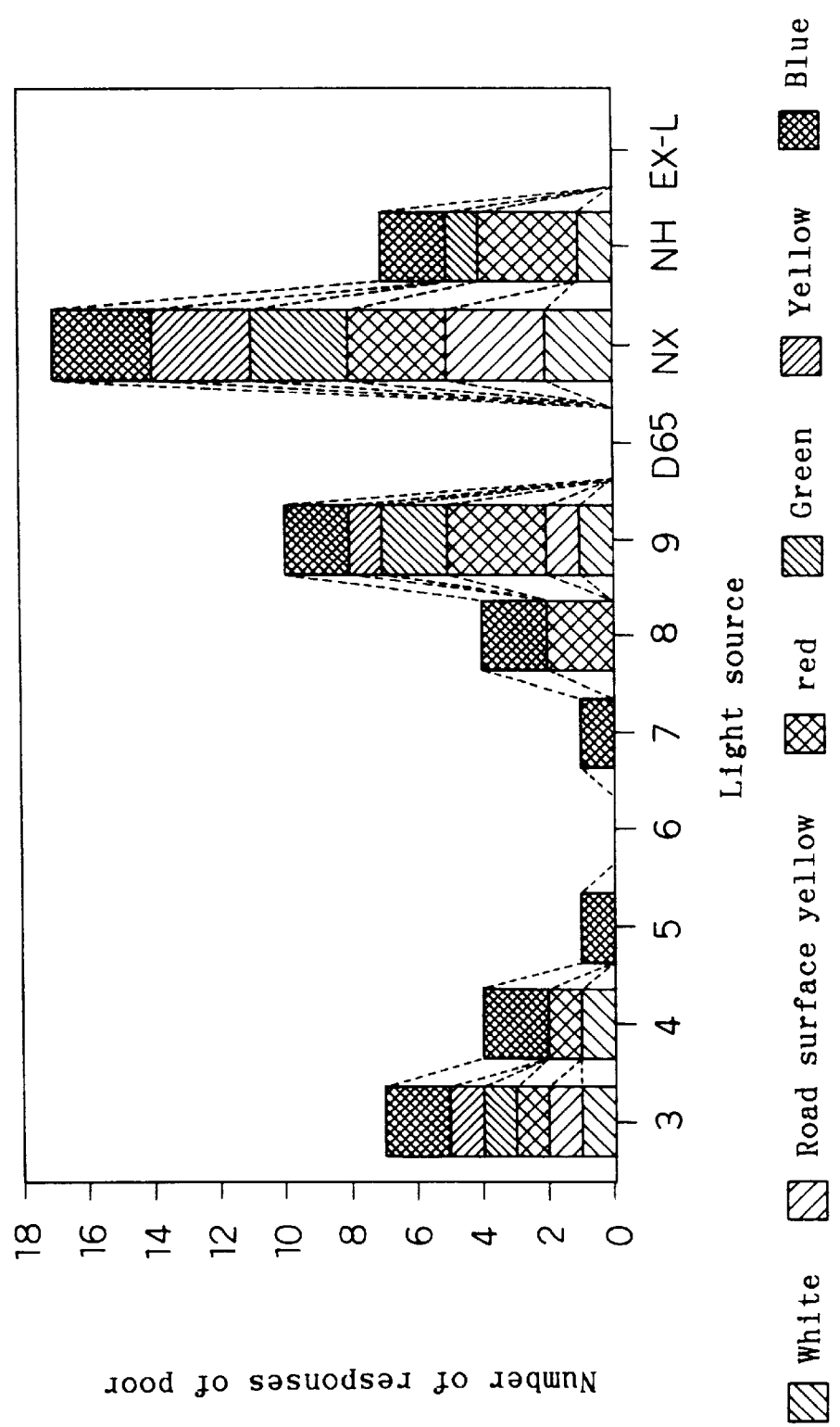
FIG. 14 shows the accumulated number of times categorical color rendering was evaluated as "poor".

FIG. 12, FIG. 13 and FIG. 14 show the results of categorical color rendering evaluation in which sensory evaluation was done to determine whether color of white, red, green, yellow and blue used in traffic signs and a color of yellow used in road surface marking were "good", "acceptable" or "poor" in terms of color perception. FIG. 12 shows a histogram which represents the number of times the color was evaluated as good or acceptable, FIG. 13 shows a histogram representing the number of times the color was evaluated as good, and FIG. 14 shows a histogram representing the number of times the color was evaluated as poor.

The colors used for traffic sign colors are white: N9.3, black: N1.5, red: 7.5R4/13.5, green: 5G4/8, yellow: 2.5Y8/12.5, blue: 7.5PB2.5/7.5. The colors specified in the Ordinance on Road Traffic Signs (refer to "Road Traffic Sign Handbook" edited by Japan Contractors Association of Traffic Signs and Line Markings, supervised by the Ministry of Construction, Road Bureau and National Police Agency, Traffic Bureau). The color chip for yellow of road surface marking represents the road marking yellow 5.5YR6.5/12 specified by the National Police Agency (yellow color sample for road signs manufactured by Japan Contractors Association of Traffic Signs and Line Markings).

The hisograms 3, 4, 5, 6, 7, 8 and 9 in the drawing show the results of evaluation with the lights of FIG. 5, FIG. 6, FIG. 7, FIG. 8, FIG. 9, FIG. 10 and FIG. 11, respectively.

D65 shows the results of evaluation with a fluorescent lamp for color evaluation with a spectral distribution near that of reconstituted daylight D65. NX shows the results of evaluation with a low pressure sodium lamp, NH shows that with a high pressure sodium lamp and EX-L shows that of a three band radiation type fluorescent lamp of incandescent lamp color.

With the D65 fluorescent lamp which is a reference lamp for color comparison, largest number of responses evaluated the color perception as good, while the low pressure sodium lamp received the smaller number of evaluation of "good". Number of responses which evaluated the color perception as "poor" was, on the contrary, smallest with the D65 fluorescent lamp and greatest with the low pressure sodium lamp.

In case the light from No. 3 to No. 9 composed by changing the flux ratio of LAP and YOX in this embodiment, the evaluation changes depending on the proportion, although the evaluation is higher when the DUV value is on the positive side than when the DUV is on the negative side, indicating a tendency of evaluation being maximized when the DUV value is on the positive side. In the case of this experiment, the proportion No. 6 achieved the largest number of responses evaluating the color perception as good, while the proportion No. 6 achieved the least number of responses evaluating the color perception as poor.

When responses with evaluations of good and acceptable are regarded as showing tolerable properties for the purpose of assuring minimum necessary level of color perception, proportion No. 6 performed comparably with D65 and EX-L and satisfied the color perception requirements at the tolerable level. It is also shown that color perception with the low pressure sodium lamp and the high pressure sodium lamp is lower in the degree of acceptance than the proportions No. 4, 5, 6 and 7.

Figure 15:
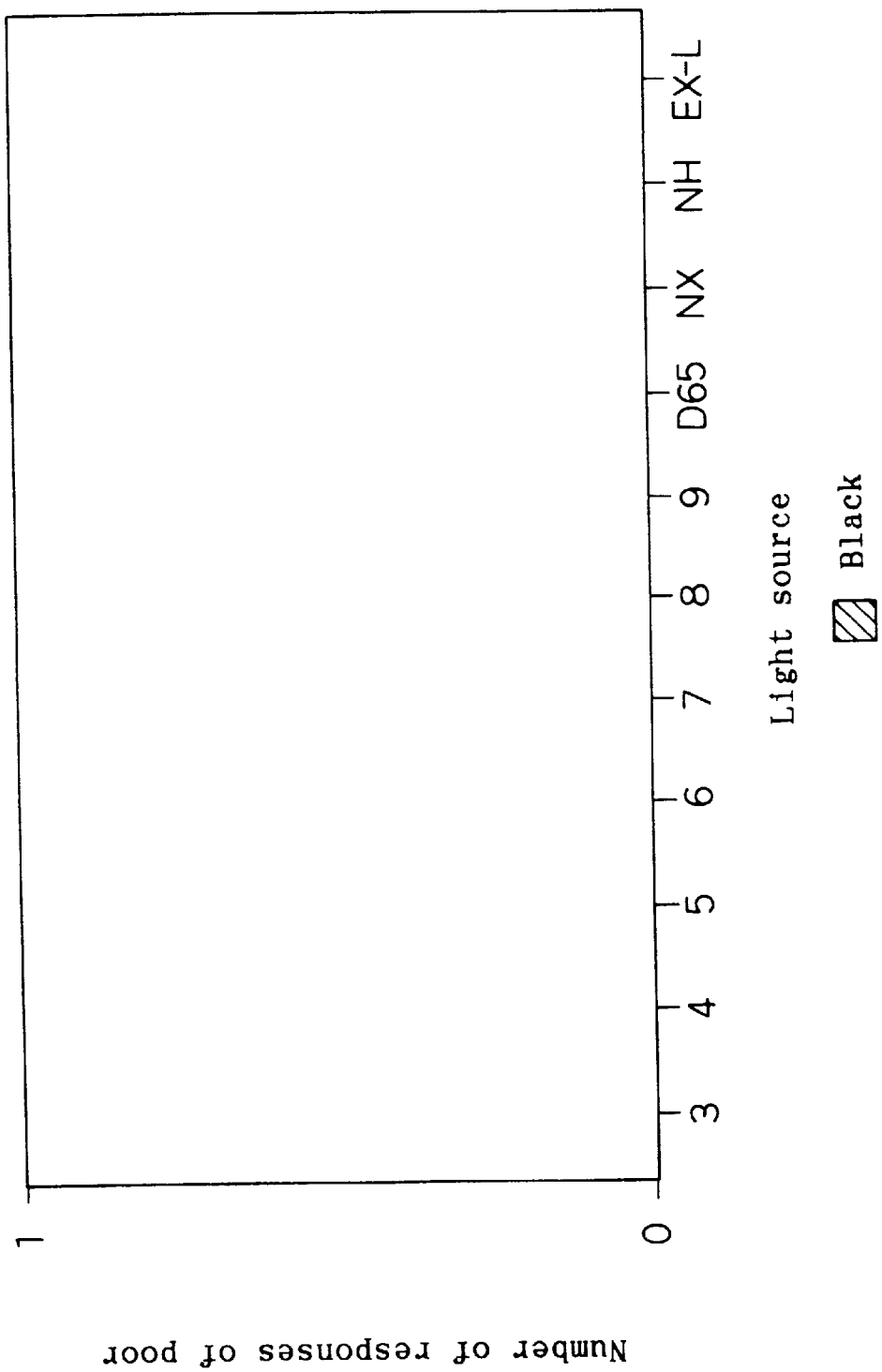
FIG. 15 shows the accumulated number of times categorical color rendering of black color chip was evaluated as "poor".

FIG. 15 shows a histogram representing the number of times the black color used in traffic signs was evaluated as poor in the color rendering properties.

That the graph is blank means that all responses evaluated as good. From this result, it can be seen that achromatic color for defining the minimum necessary color rendering properties may be represented by white.

When these results are summarized to examine the degree of acceptance for the color rendering properties of color chip of traffic sign color which is a kind of safety color, red is coded for signs of relatively high degrees of danger and urgency, and blue is coded for instruction and guidance signs of relatively low degrees of danger and urgency. Thus it can be said that the light source of positive DUV value has higher degree of acceptance for safety color perception than that of negative DUV value which is evaluated as "unacceptable" for red.

These results indicate higher performance than the low pressure sodium lamp and the high pressure sodium lamp which are commonly used in traffic lighting for the reason of efficiency, showing the superiority of the R-G base dual band radiation type light source.

Figure 16:
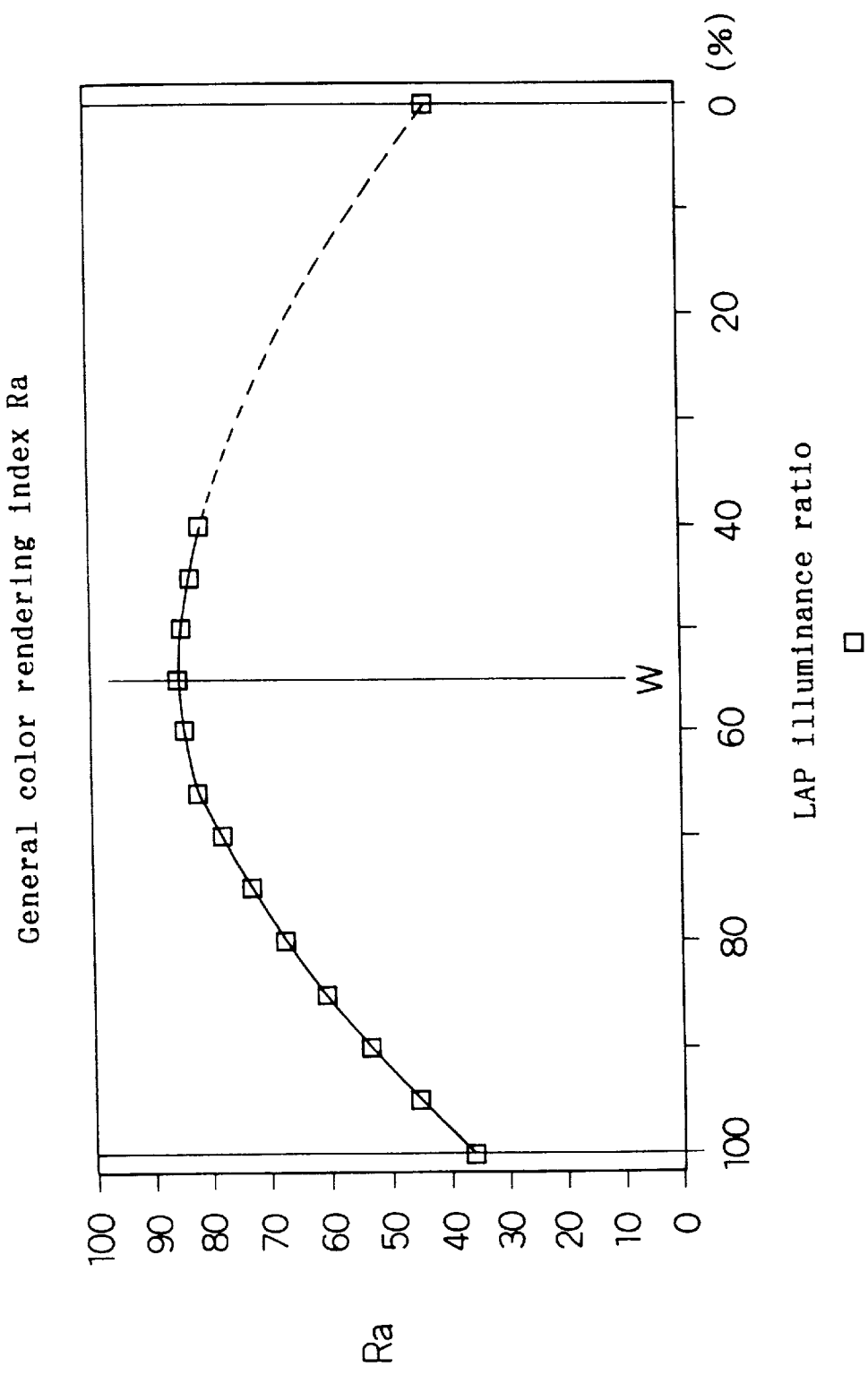
FIG. 16 shows the relationship between Ra and the flux ratio LAP/YOX is changed.

FIG. 16 shows the general color rendering index Ra of the fluorescent lamp which was numerically simulated by changing the flux ratio of LAP and YOX. Leftmost point in the graph shows the case where the proportion of LAP flux is 100% and the rightmost point shows the case where the proportion of LAP flux is 0%, namely the proportion of YOX flux is 100%, with the proportion of LAP flux decreasing to the right.

It can be seen that the point indicated by W in FIG. 16 is the point where DUV is 0 and Ra reaches the maximum value at this point. This means that, when the dual band radiation type light source is evaluated by the conventional evaluation technique based on Ra with the scheme of evaluating color rendering properties according to the color difference from the color perception under the reference light source, the point where DUV is 0 becomes the point of highest value.

When subjective evaluation of categorical color reproduction is conducted by human subjects, on the contrary, a point of higher subjective evaluation occurs on the side of positive DUV value, namely on the side where the luminous flux ratio of LAP is greater than W. Thus it will be seen that the invention deals with a novel operation effect of a phenomenon different from the conventional evaluation according to Ra.

Now the reason why such novel operation effect is obtained will be described below.

In the experiment, together with the evaluation of categorical color rendering described previously, subjective evaluation by elemental color naming method was conducted.

This technique comprises a first experiment in which a subject who is given 10 points looks at a color chip produced and assigns his points to the chromaticness and achromaticness he feels from the color, and a second experiment in which the subject is given 10 points again and selects one or two from among reddishness, greenishness, yellowishness and bluishness for the chromaticness thereby to assign his points.

By multiplying the evaluation point of the chromaticness obtained with this technique by the evaluation points of reddishness, greenishness, yellowishness and bluishness, subjective color feeling of the subject can be represented.

The subjective color can be represented by a point on a rectangular coordinate plane defined by two axes; one is an axis of opponent colors of reddishness and greenishness and the other is an axis of opponent colors of bluishness and yellowishness. When this is defined as subjective chromaticity coordinate, subjective chromaticity coordinate position of every one of color chips evaluated under various light sources is determined and the area surrounded by the positions can be calculated.

When this area is represented by the subjective Gamut area Ga obtained in the elemental color naming technique, the higher this value, the more clearly the color appears to the observer.

Figure 5:
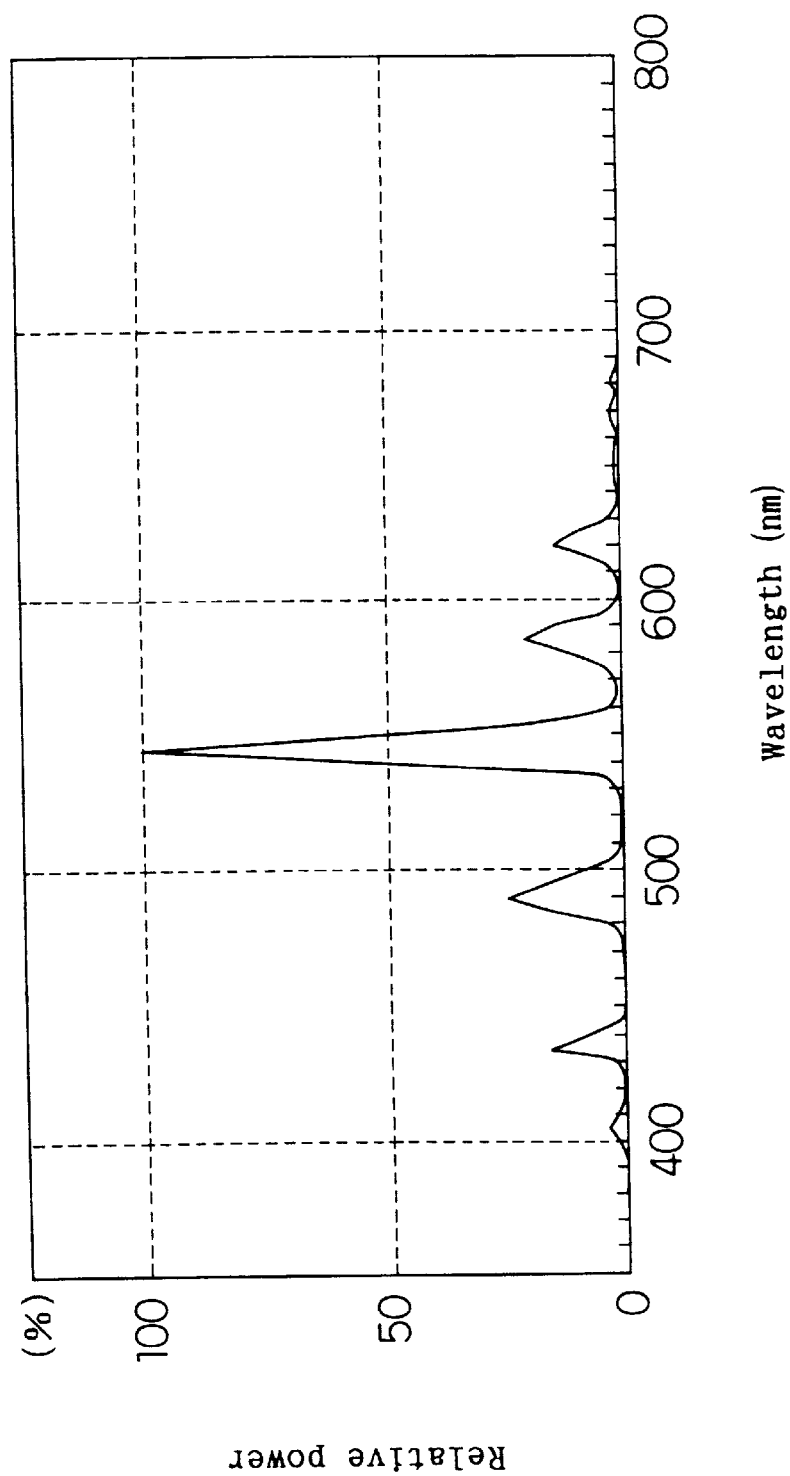
FIG. 5 shows a spectral distribution of a fluorescent lamp having flux ratio LAP/YOX of 100:0.
Figure 6:
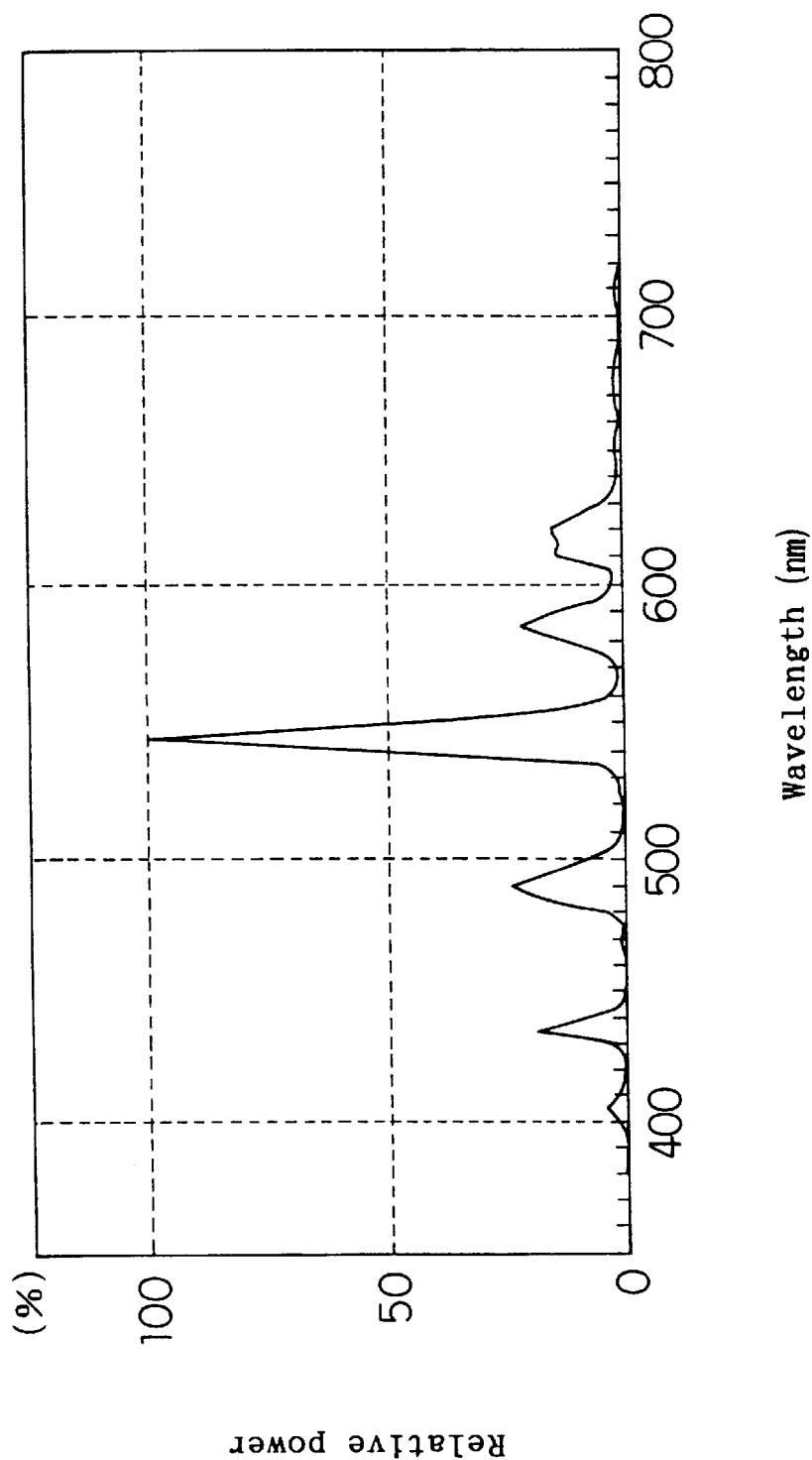
FIG. 6 shows a spectral distribution of a fluorescent lamp having flux ratio LAP/YOX of 93:7.
Figure 7:
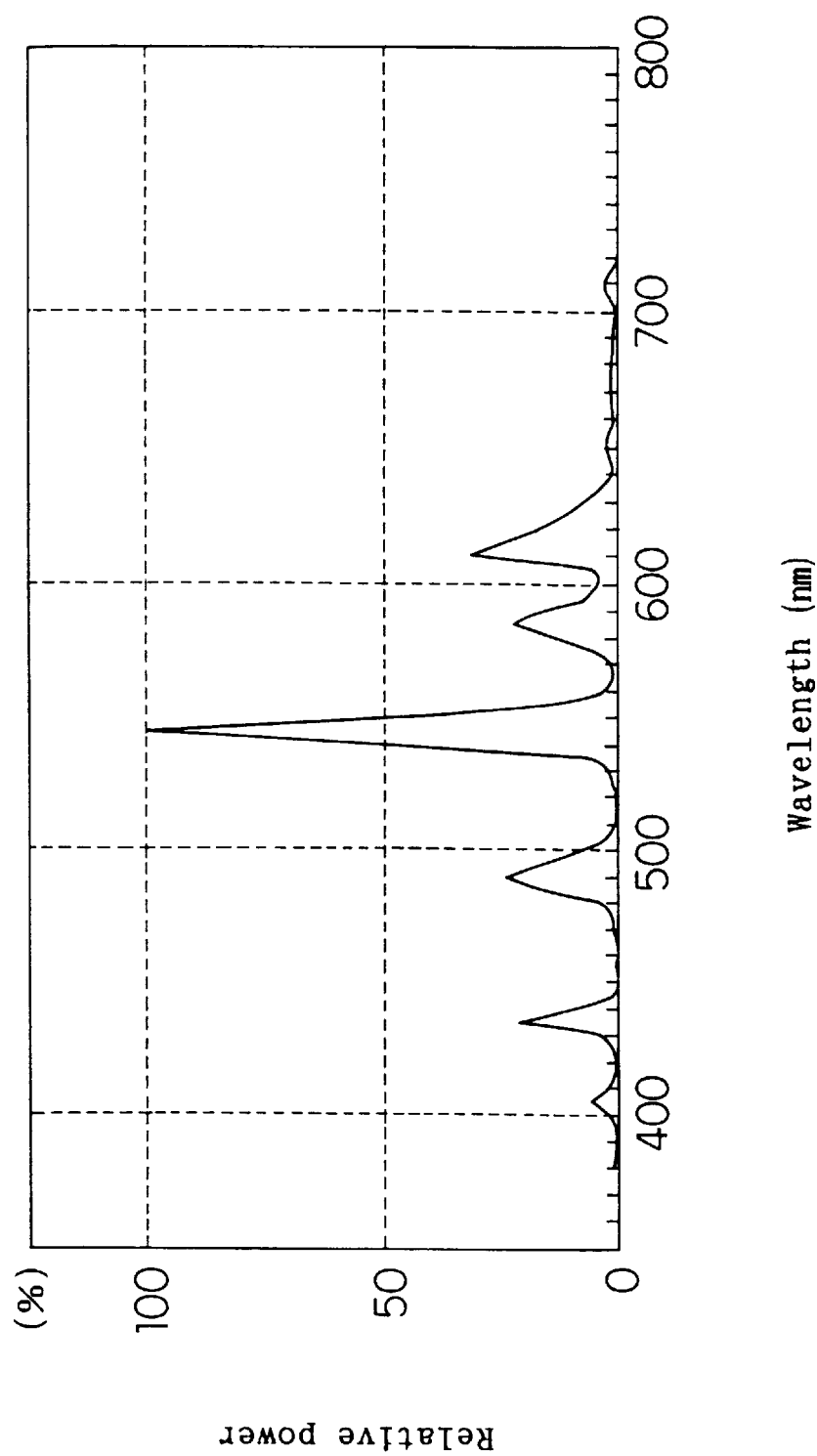
FIG. 7 shows a spectral distribution of a fluorescent lamp having flux ratio LAP/YPX of 85:15.
Figure 8:
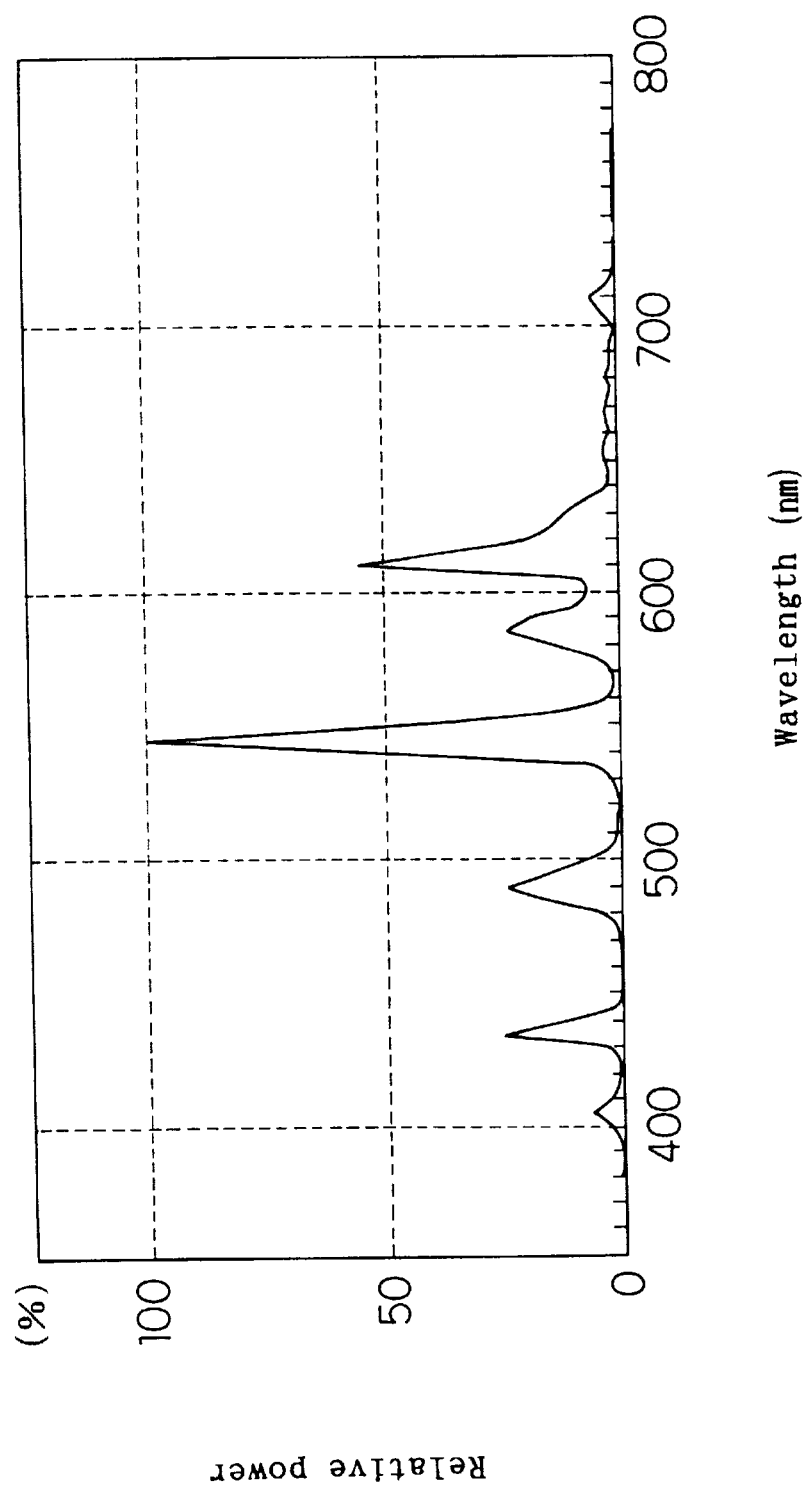
FIG. 8 shows a spectral distribution of a fluorescent lamp having flux ratio LAP/YOX of 76:24.
Figure 9:
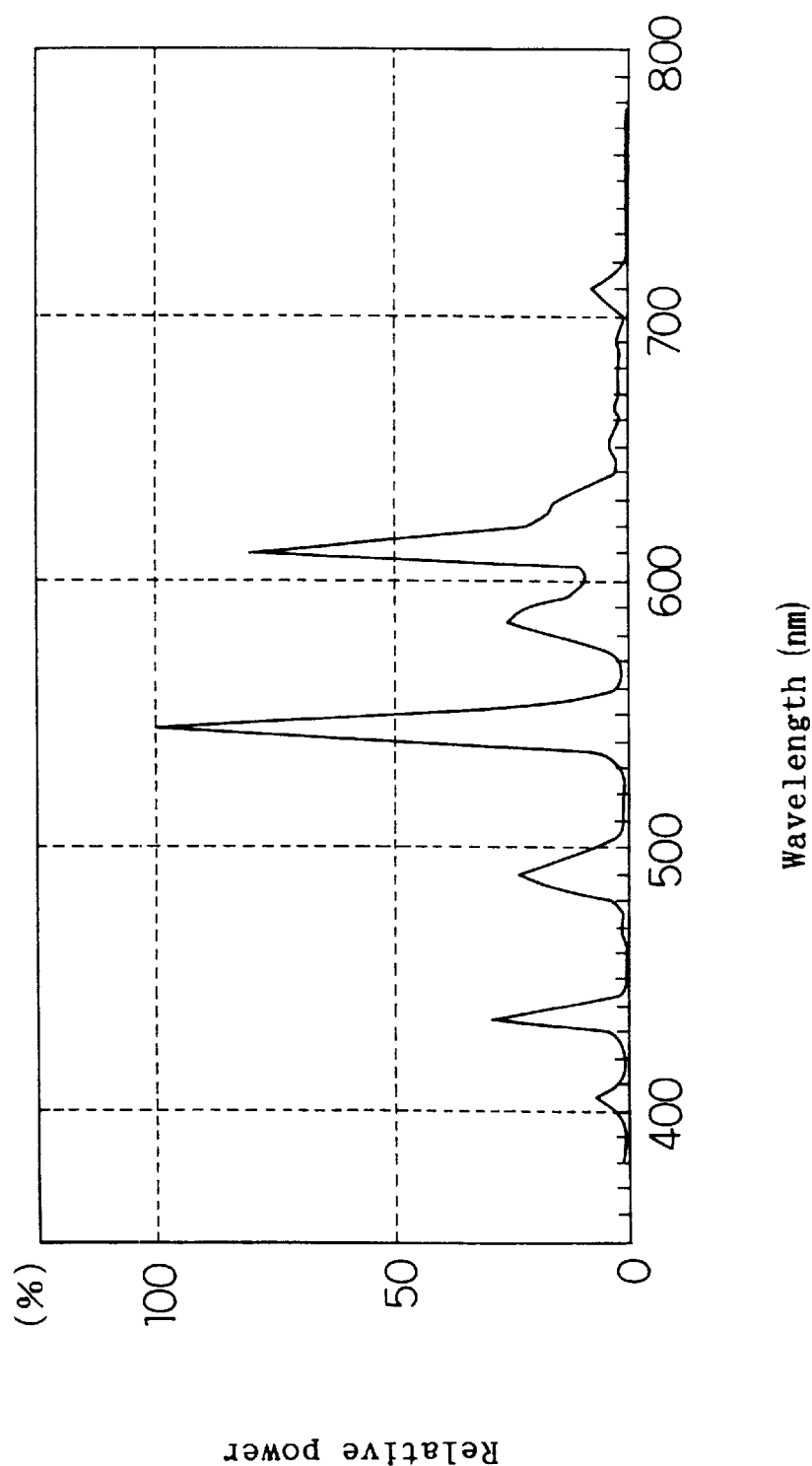
FIG. 9 shows a spectral distribution of a fluorescent lamp having flux ratio LAP/YOX of 68:32.
Figure 10:
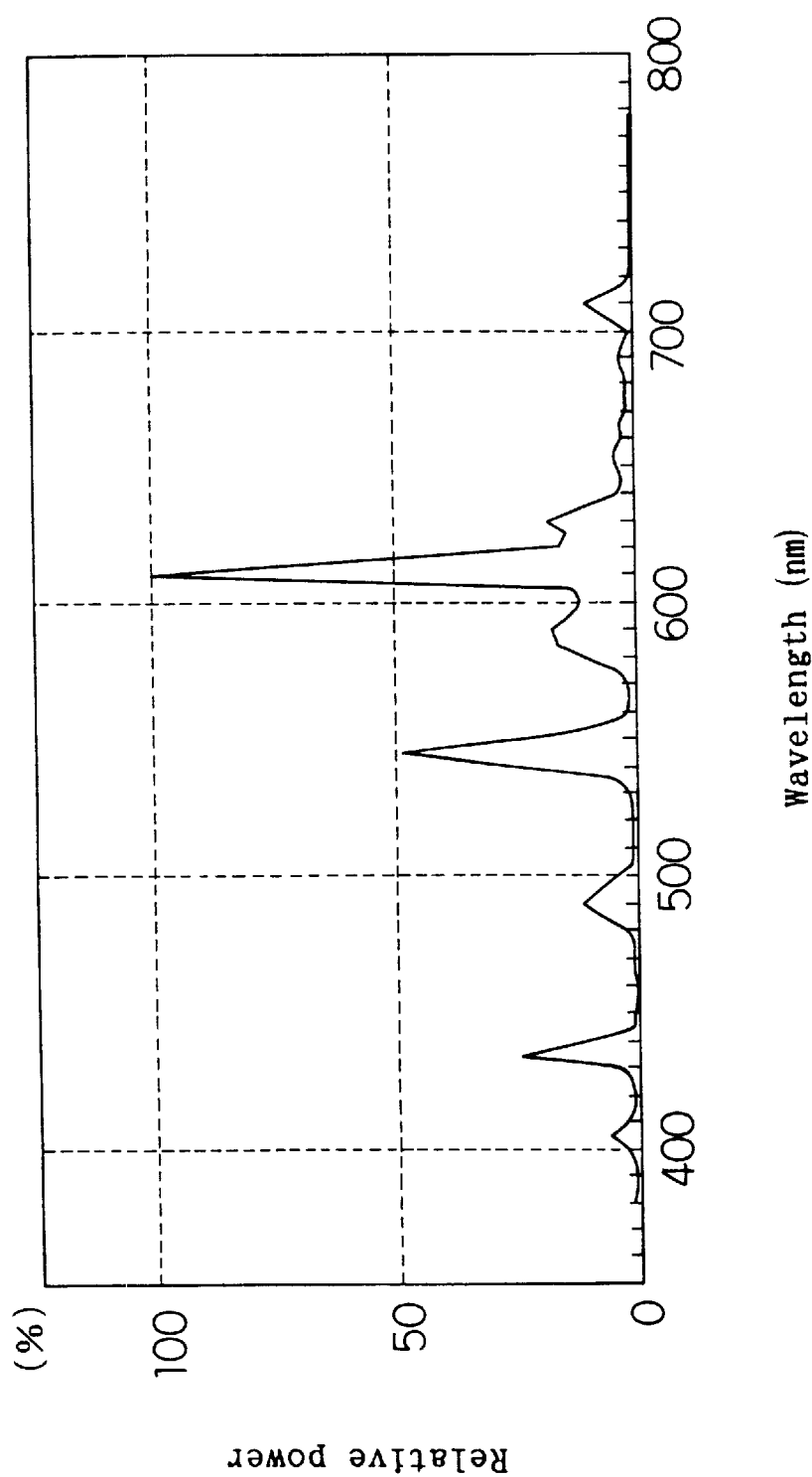
FIG. 10 shows a spectral distribution of a fluorescent lamp having flux ratio LAP/YOX of 43:57.
Figure 11:
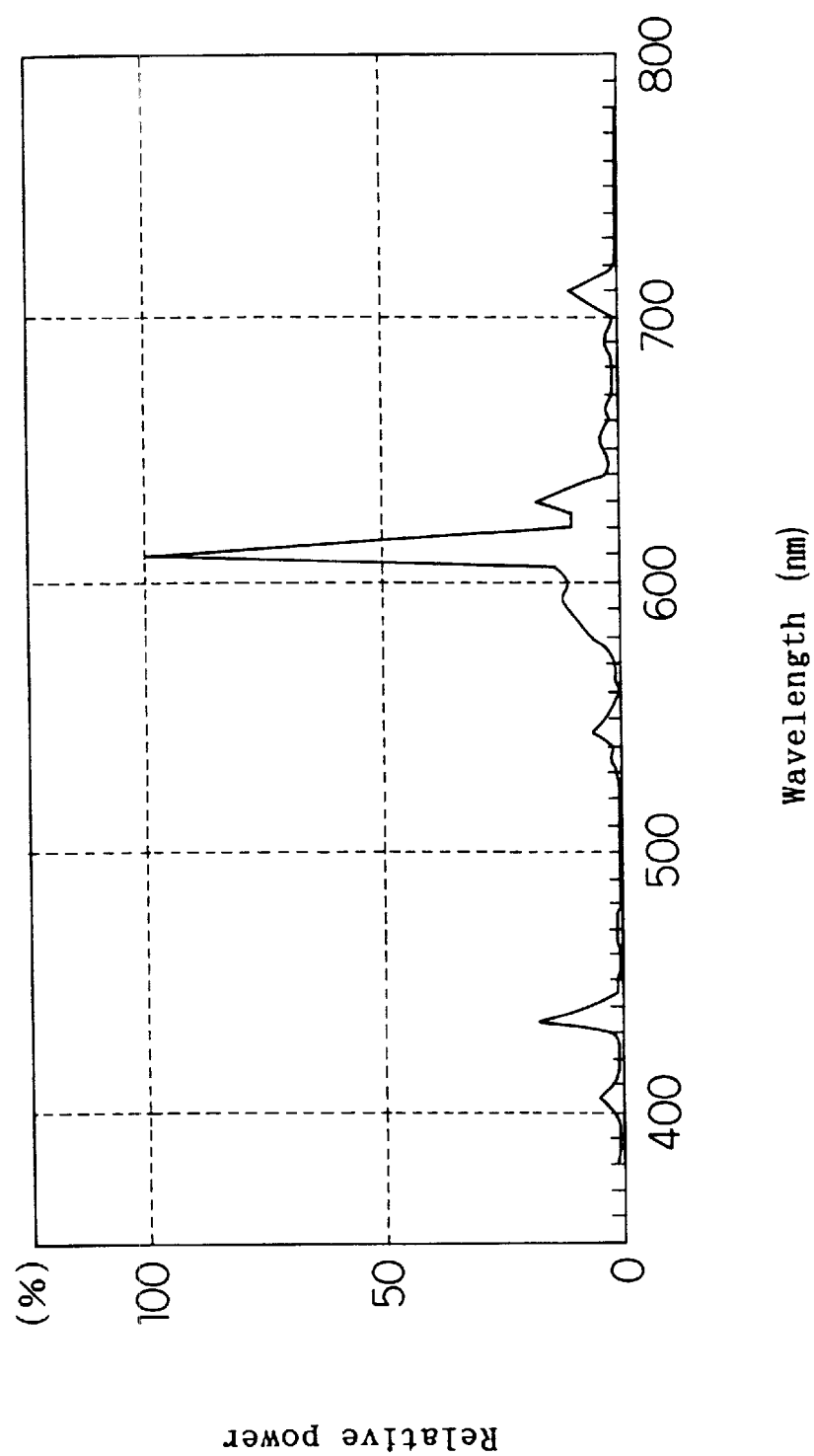
FIG. 11 shows a spectral distribution of a fluorescent lamp having flux ratio LAP/YOX of 0:100.
Figure 17:
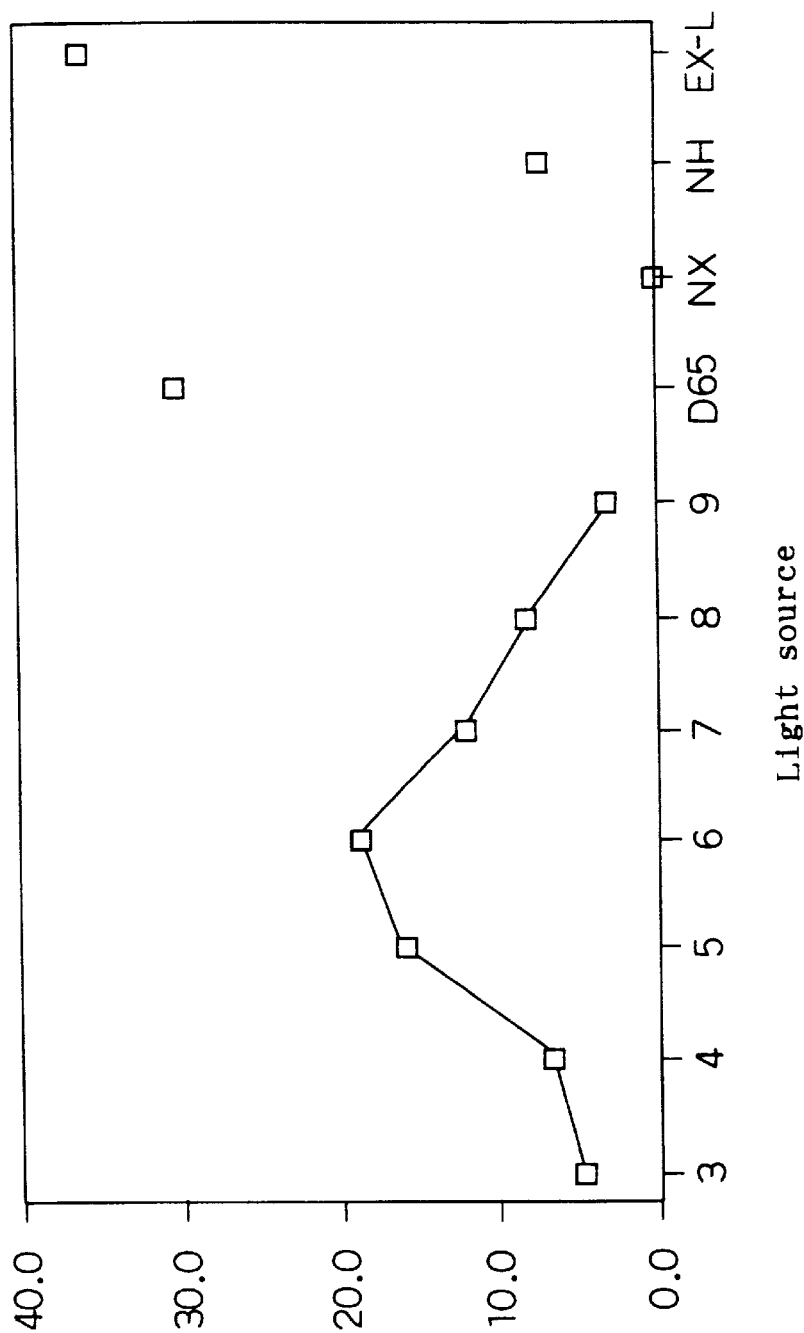
FIG. 17 shows the value of subjective Ga obtained by elemental color naming for each type of light source.

FIG. 17 shows the values of subjective Ga obtained by the elemental color naming technique for different light sources. From the left to the right in FIG. 17, 3 is for FIG. 5, 4 is for the fluorescent lamp of FIG. 6, 5 is for the fluorescent lamp of FIG. 7, 6 is for the fluorescent lamp of FIG. 8, 7 is for the fluorescent lamp of FIG. 9, 8 is for the fluorescent lamp of FIG. 10, 9 is for the fluorescent lamp of FIG. 11, D65 is for the color evaluation fluorescent lamp with spectral distribution near that of synthesized daylight D65, NX is for the low pressure sodium lamp, NH is for the high pressure sodium lamp and EX-L is for the three band radiation type fluorescent lamp of incandescent lamp color.

The value of subjective Gamut area: Ga obtained by the elemental color naming technique has the highest point in the case of proportion 6 similarly to the result of evaluation of the categorical color rendering where the color of the color chip is subjectively evaluated whether it is good, acceptable or poor.

When examining these subjective evaluations combined, categorical color perception improves at the point where DUV is shifted to the positive side so that the evaluation can be considered to have improved. That is, in such a case as this invention, deterioration in the accurate reproducibility of a color chip is compensated for by the improvement in the color separation due to the improvement in the subjective color clearness, resulting in an improving effect of the categorical color perception.

Validity of this examination can be proved by the fact that the points where improvement occurs are common when the results of several subjective evaluation techniques are evaluated in many aspects.

To sum up, the effect of the lamp of the invention captures an phenomenon which is not captured in the conventional evaluation methods. Also according to the invention, efficiency of a lamp can be improved because the spectral distribution is concentrated in the wavelength region from 530 to 580 nm where the spectral luminous efficiency is high. Further, the invention has such a feature that the proportion of the above wavelength region increases in the spectral distribution and the lamp efficiency increases when DUV deviates to the positive side.

It is an important point to determine the limitation on the value of DUV on the positive side from the categorical color perception, in designing a lamp of higher efficiency while maintaining the minimum necessary level of color perception.

Figure 18:
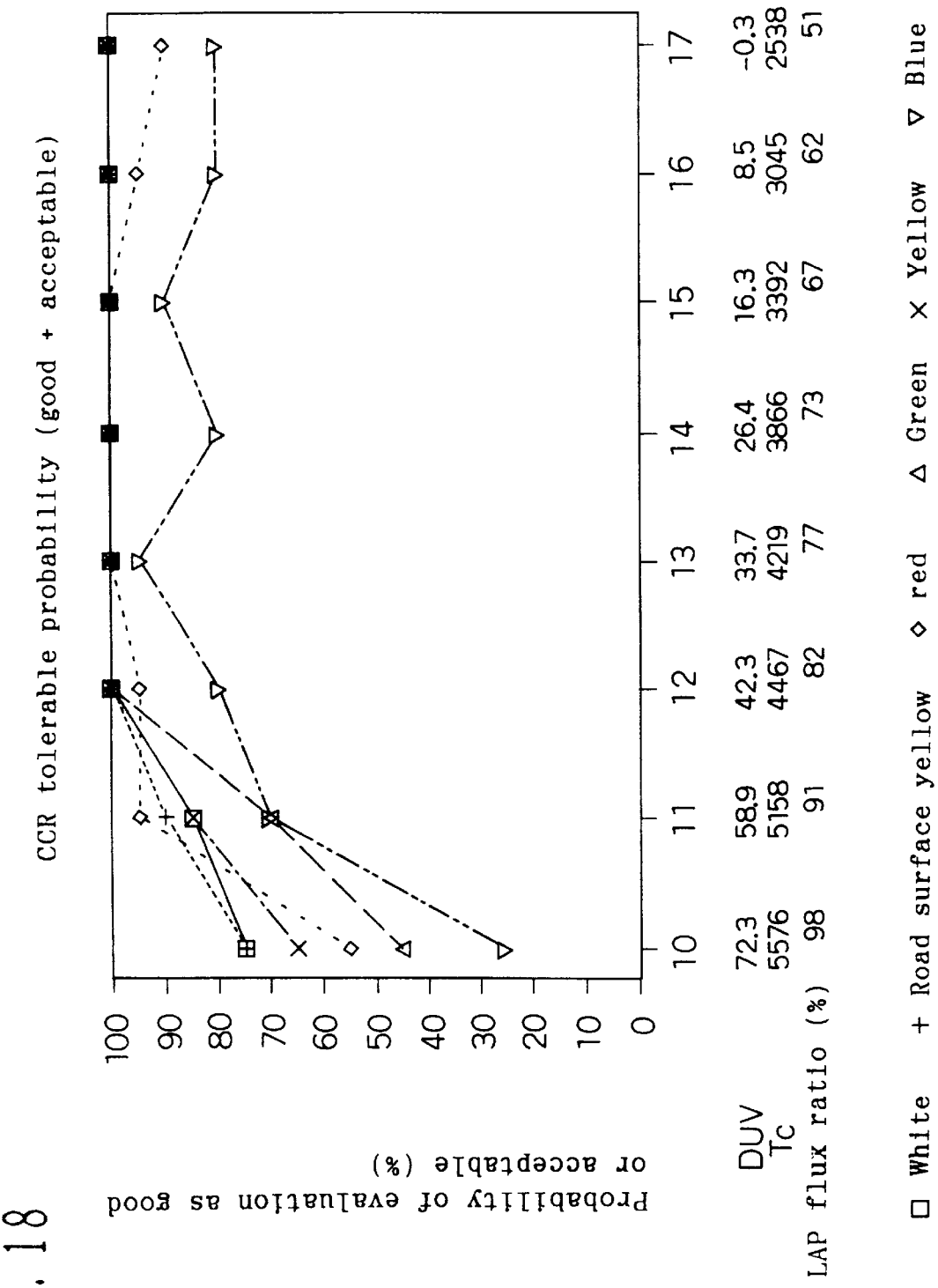
FIG. 18 shows the probability of response which evaluates the color appearance as "good" or "acceptable" being obtained when light flux ratio of LAP and YOX fluorescent lamps is changed.
Figure 19:
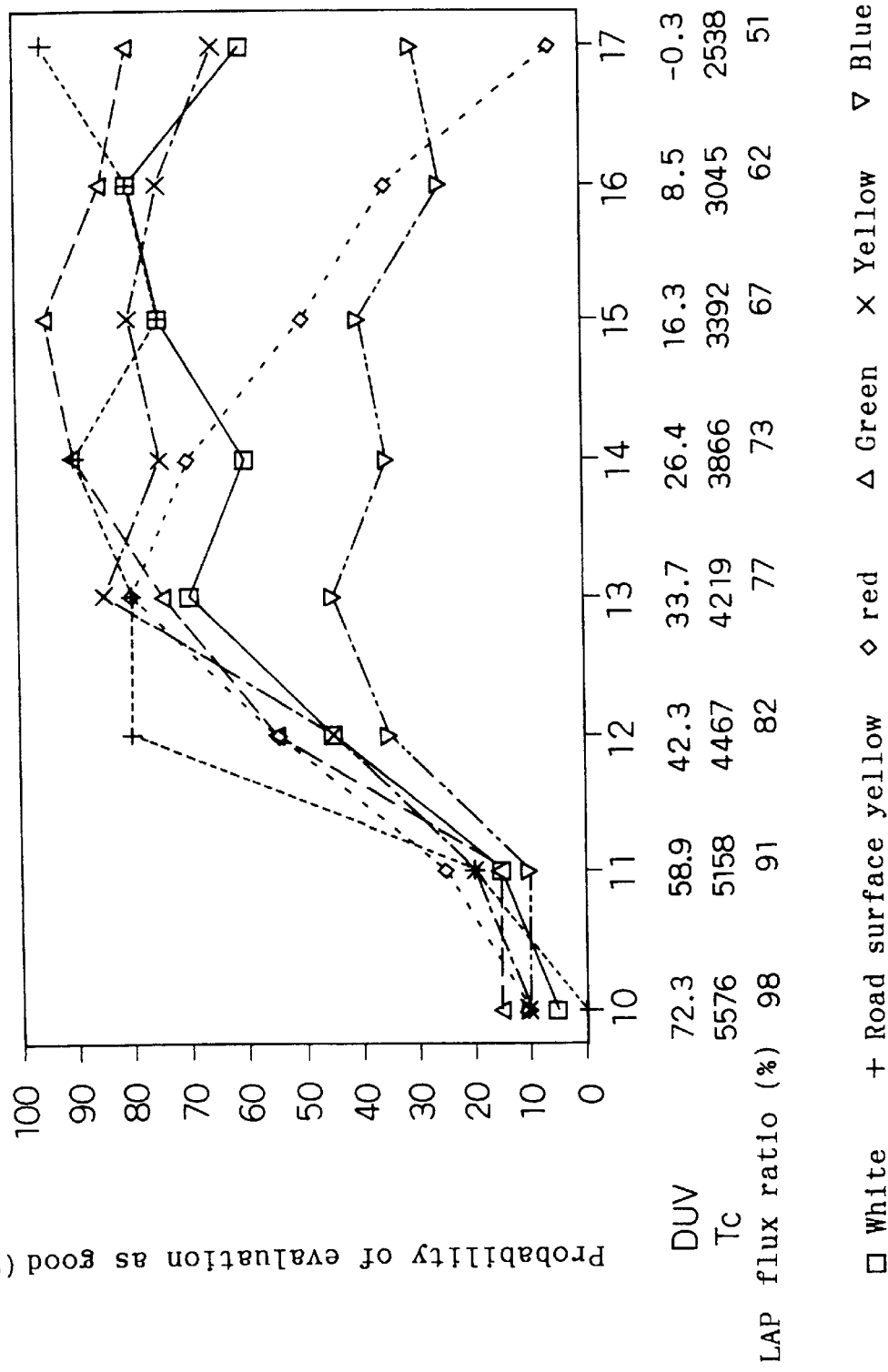
FIG. 19 shows the probability of response which evaluates the color appearance as "good" being obtained when light flux ratio of LAP and YOX fluorescent lamps is changed.

FIG. 18 and FIG. 19 show the relationship between the changes in the value of DUV with the changes in two emission peaks and the probability of responses evaluating the color perception as good and acceptable and the probability of response evaluating the color perception as good being obtained, when the ratio of blending the light from LAP and YOX fluorescent lamps is changed from near that of LAP only of 10 to near DUV0 of 17 (closer examination was given to the positive side of DUV value). Peak intensity ratio of LAP:YOX is about 1:2 in the case of fluorescent lamp of 10 where DUV is about 0, and peak intensity ratio of LAP:YOX is about 10:1 in the case of fluorescent lamp of 17 where DUV is about 72. The probability of responses which evaluate the color perception as good and acceptable being obtained in FIG. 18 will be described below.

Responses which evaluate the color perception as good and acceptable combined decrease rapidly when DUV is greater than 70. Assuming that the required color perception can be assured when DUV is 70 or less, it can be said that categorical color perception is assured in a region from near DUV of 0 to near 70, namely in a region where the ratio of emission peak intensity of LAP:YOX is from 1:2 to 10:1. In this experiment, too, high evaluation is given in the region of DUV over 0 up to 70, not at 0.

While the change in the evaluation with the change in the ratio of flux LAP and YOX is less conspicuous in this experiment compared to the previously described experiment, this difference corresponds to the difference in the method of providing the evaluation stimulus between the experiments.

The previous experiment is an experiment of extracting the aspect of change in the evaluation, wherein evaluation stimuli were provided successively according to the change in the ratio of flux LAP and YOX, for the purpose of studying the aspect of change in the evaluation with the change in the ratio of flux LAP and YOX.

This experiment, on the contrary, is an experiment of extracting the absolute value of probability of evaluation to be obtained, wherein evaluation stimuli were provided randomly while increasing the number of repetitions regardless of the change in the ratio of blending the light of LAP and YOX, for the purpose of determining the occurrence rate of the evaluation with the change in the ratio of blending the light of LAP and YOX.

In case the limitation for securing the minimum necessary categorical color perception is to be determined by evaluating the categorical color perception based on the degree of acceptance of recognizing a color, the region of DUV from 0 to 70 can be taken where DUV deviates to the positive side unlike the prior art.

This may be because the color constancy of visual sense, which means that color perception of the same object in a visual environment does not change significantly even when the light which illuminates the visual environment changes, because of the adaptation of the human visual sense to the illumination light, continues to work up to about 70 of the DUV value and therefore categorical color perception can be obtained due to color adaptation.

The probability of responses which evaluate the color perception as good and acceptable being obtained in FIG. 19 will be described below.

In case such a technique of experiment as the evaluation stimuli are provided randomly instead of providing the evaluation stimuli successively as in this case, substantial range of color perception up to near 70 in the DUV value is accepted as far as the evaluation is "acceptable" or higher and difference in evaluation becomes less conspicuous. In case the difference in evaluation is extracted with higher sensitivity by the probability of evaluation "good" being obtained, preferred range for the perception of red which is particularly important color is from about 10 to 45 of the DUV value. It can also be seen that high evaluation is given in the region of DUV over 0 up to 70, not at 0, despite the difference in the experiment technique.

Figure 20:
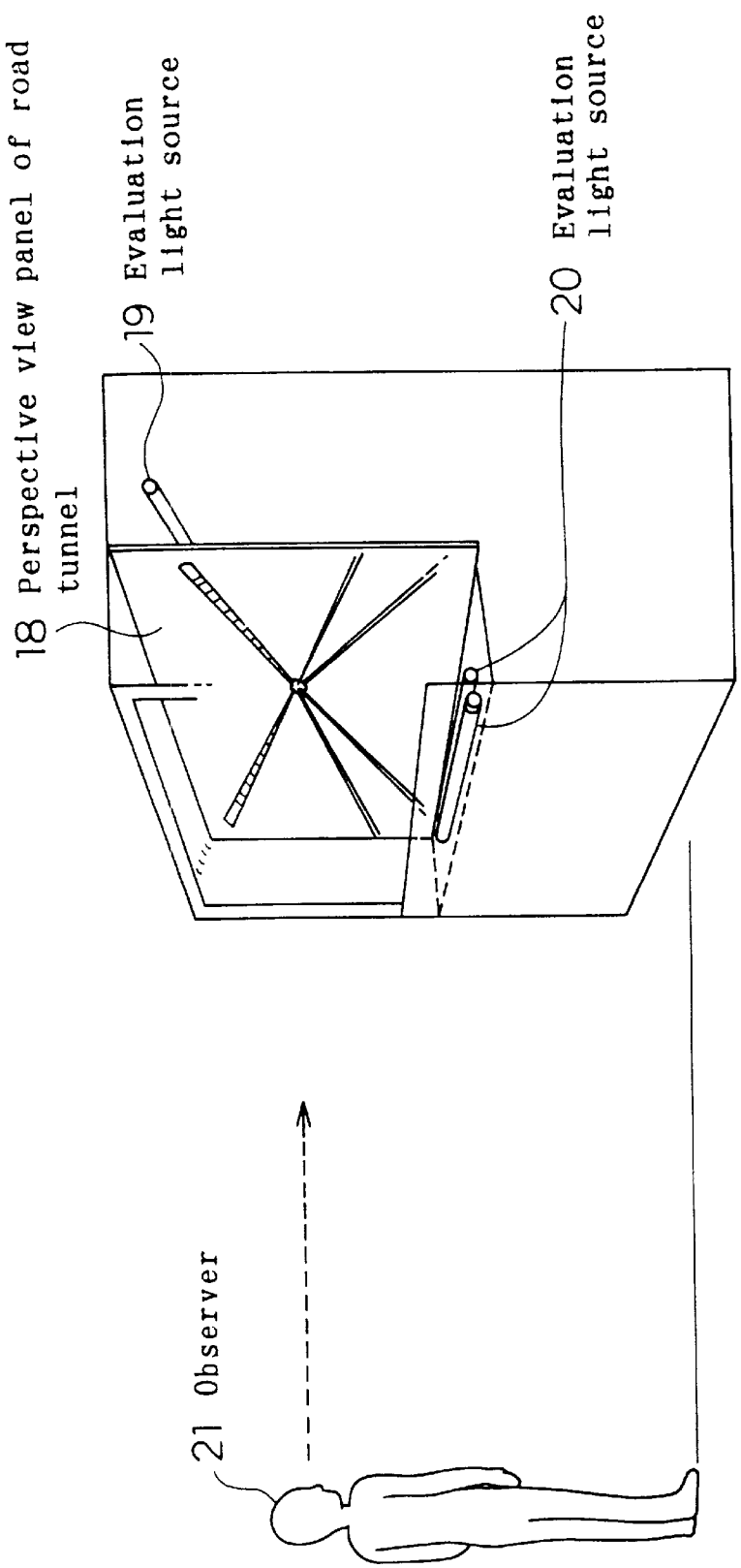
FIG. 20 shows an experimental apparatus for the evaluation of the sense of incongruity of light equipment's light color as the visual environment of road tunnels.

A prototype fluorescent lamp was made by using two phosphors LAP and YOX, visual environment of road tunnel was created with an experimental apparatus as shown in FIG. 20, and evaluation experiment for the sense of incongruity of lamp color was conducted.

Specifically, a perspective view panel 18 of a road tunnel was installed with a portion of the perspective view panel 18 corresponding to a light source being cut out and the luminance of the light source being given by illuminating from an evaluation light source 19 arranged on the rear of the panel, while adaptation luminance of the visual environment is given from an evaluation light source 19 arranged in front of the panel. A scene for simulating the visual environment was created in a dark room with such an arrangement.

An observer evaluator 21 can see only the light emitted from the evaluation light source 19 disposed at the light source portion of the perspective view panel 18, and cannot see the evaluation light source 20 disposed in front of the perspective view panel 18. Namely, the evaluation light source 20 disposed in front of the panel 18 illuminates the panel 18 but cannot be seen by the evaluator 21. By providing the adaptation luminance of the observer's eyes, and the luminance of the light source itself independently, experimental conditions of the visual environment is regulated constant for each light source.

With this arrangement, the light source of the invention was evaluated as lighting environment by simulating the lighting environment in the dark room. Elemental color naming technique was employed for the method of evaluation.

Figure 21:
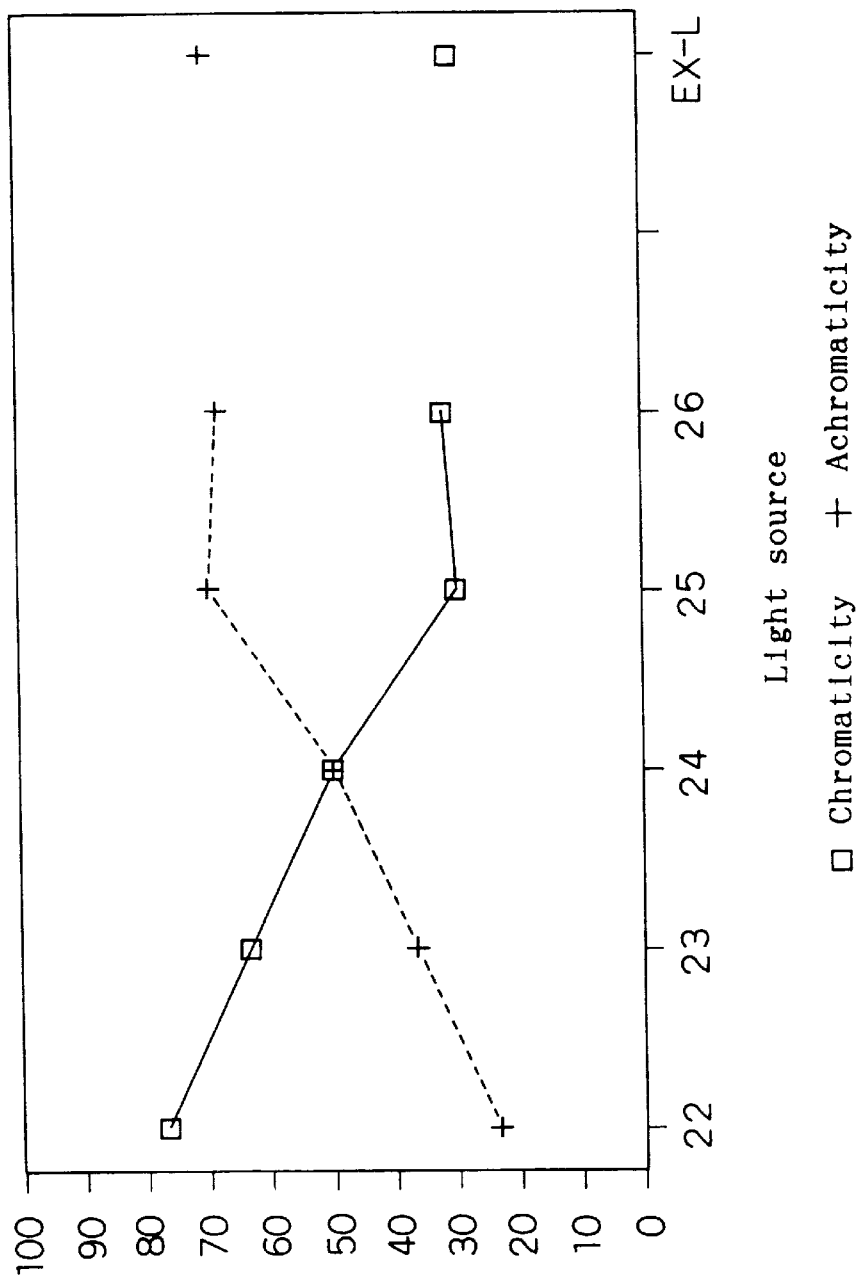
FIG. 21 shows the ratio of subjective evaluations of chromaticity and achromaticity in an experiment of evaluating the sense of incongruity of lamp light color as the visual environment of road tunnels.
Figure 22:
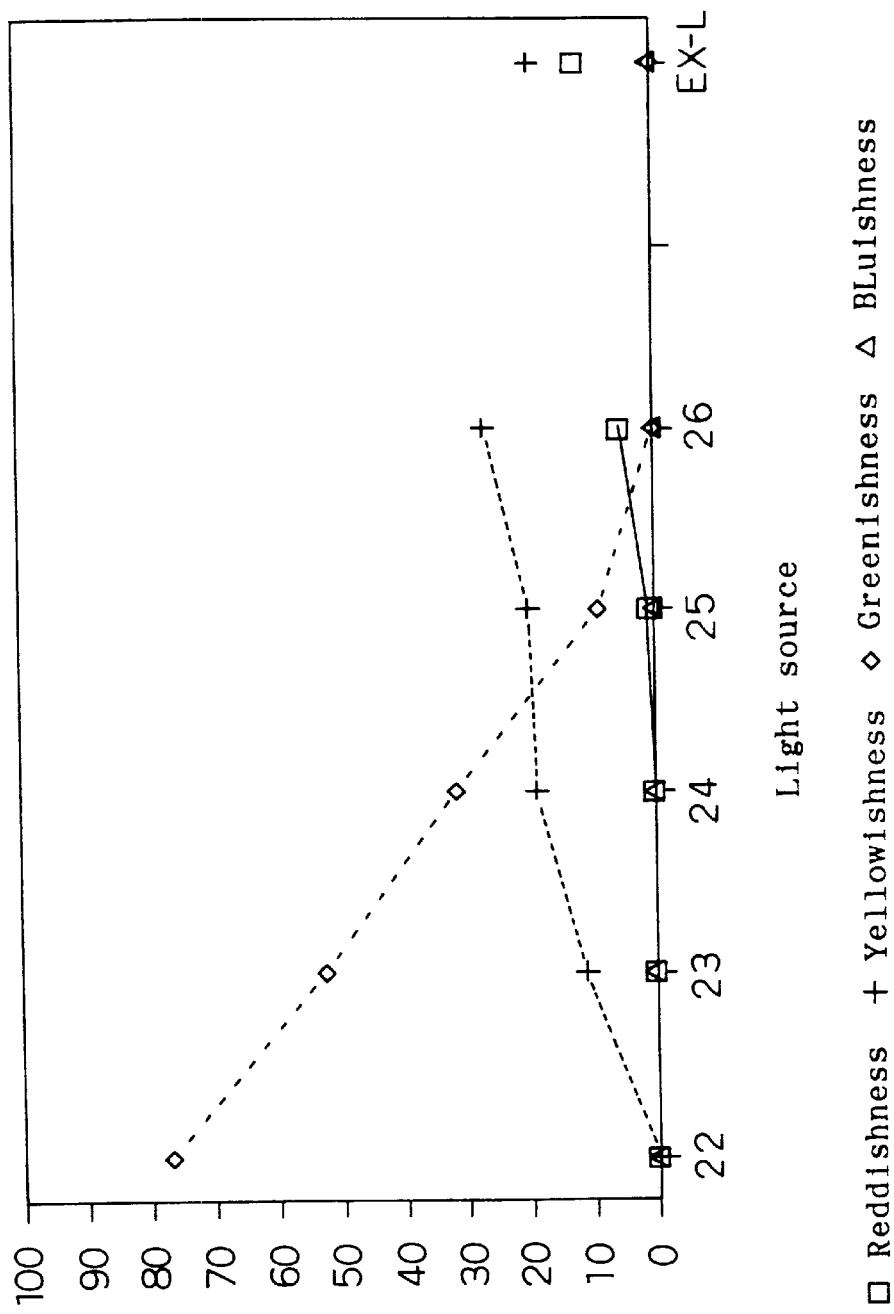
FIG. 22 shows the ratio of subjective evaluations of light color (Reddishness, Greenishiness, Yellowishness, Bluishness) in an experiment of evaluating the sense of incongruity of lighting equipment's light color as the visual environment of road tunnels.

Results of the experiment are shown in FIG. 21 and FIG. 22.

Plotted along the abscissa of the drawing is the type of light source. From 22 to 26 are the prototype lamps, and EX-L is the three band radiation type fluorescent lamp of incandescent lamp color used for the purpose of comparison.

The elemental color naming technique comprises a first experiment where a subject who is given 10 points looks at the color of a light source produced and assigns his points to the chromaticness and achromaticness he feels from the color, and a second experiment where the subject is given 10 points again and select one or two from among reddishness, greenishness, yellowishness and bluishness for the chromaticness thereby to assigns his points.

The prototype lamp 22 has correlated color temperature of 5230 K and DUV value of 63, the prototype lamp 23 has correlated color temperature of 4820 K and DUV value of 51, the prototype lamp 24 has correlated color temperature of 4370 K and DUV value of 40, the prototype lamp 25 has correlated color temperature of 3670 K and DUV value of 23 and the prototype lamp 26 has correlated color temperature of 3261 K and DUV value of 14.

Proportions of the subjective evaluation of chromaticness and achromaticness of FIG. 21 shows that chromaticness and achromaticness of the light source are in balance in the case of the prototype lamp 24 and chromaticness of the light source becomes stronger when the proportion of LAP becomes higher. It can also be seen that the prototype lamps 25 and 26 show similar strength of chromaticity as the EX-L of fluorescent lamp of incandescent lamp color which is a commonly used light source.

Proportions of the subjective evaluation of the light color of FIG. 22 shows that the strength of greenishness and the strength of yellowishness are inverted between the prototype lamps 24 and 25, and the impression of color perception of the light source is inverted from greenish yellow to yellowish green. And as the proportion of LAP is decreased down to 26, impression of greenishness disappears while reddishness and yellowishness become the predominant impression similarly to the case of fluorescent lamp of incandescent lamp color which is the commonly used light source. This is because the range which has conventionally been used as white light source is tinted to be reddish and yellowish when the correlated color temperature is low.

When these results are taken into consideration comprehensively, correlated color temperatures of the lamp light color from 3500 to 4500 K and DUV values near 10 to 45 can be said to be the preferable range without the sense of incongruity as visual environment in terms of light color.

Figure 23:
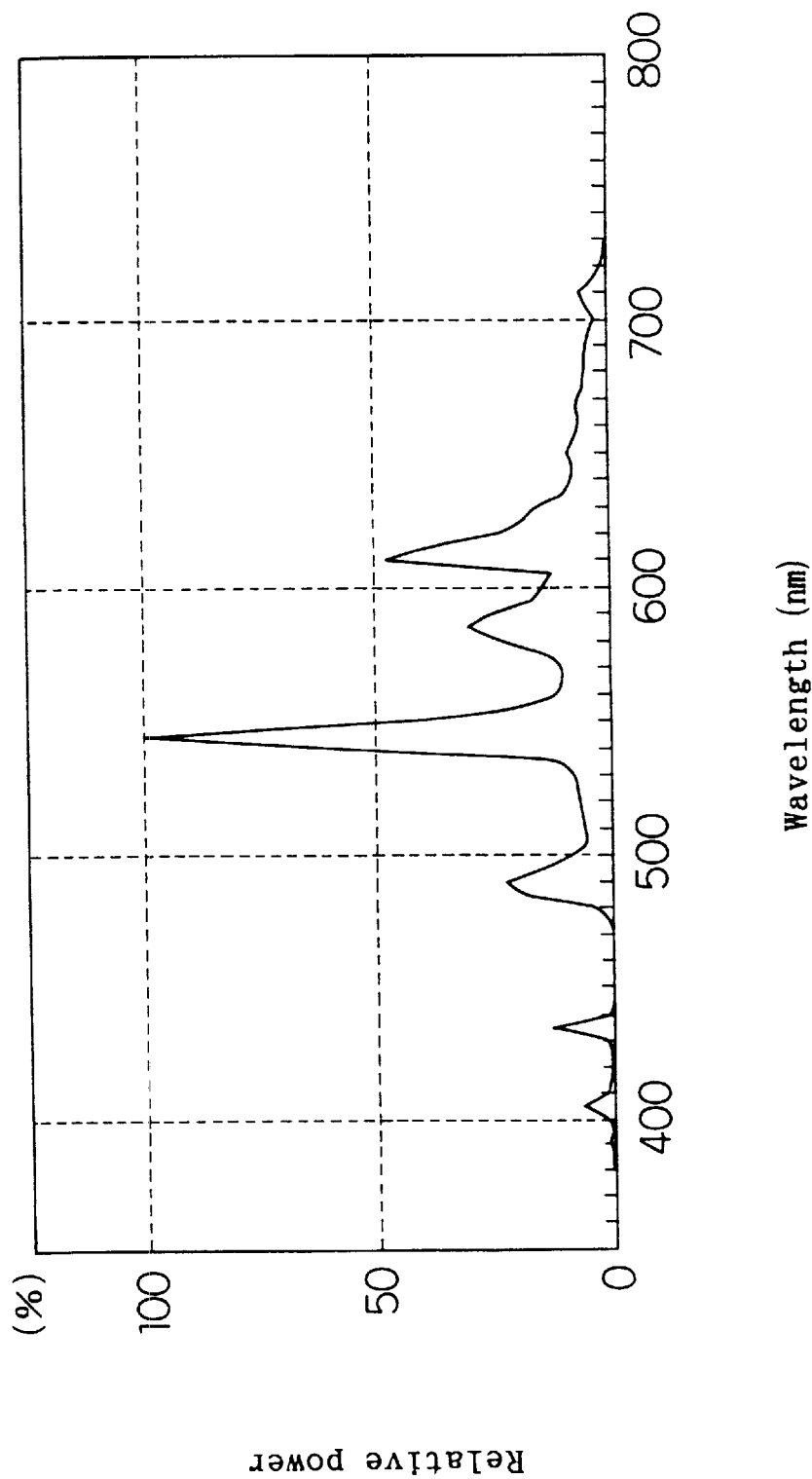
FIG. 23 shows an embodiment where a phosphor which converts blue light of visible radiation band to longer wavelength side of visible radiation band is added to the fluorescent lamp of the first embodiment.

The second embodiment is shown in FIG. 23.

This is an embodiment where a phosphor which converts blue light in the visible range to longer wavelengths in the visible range is added to the fluorescent lamp of the first embodiment.

A fluorescent lamp has emission lines of mercury also at 405 nm, 436 nm, 546 nm and 578 nm in the visible range of the emission spectrum. Among these, blue color at 405 nm and 436 nm has emission efficiency of about 1 lm/W.

Because spectral luminous efficiency is low in these wavelength bands, the lamp efficiency can be improved by about 5 [lm/W] or more by using a phosphor, which converts blue light in the visible range to longer wavelengths in the visible range, in the R-G base dual band radiation type fluorescent lamp.

Similar improvement in the lamp efficiency can be expected also by adding a phosphor, which absorbs blue emission and converts it to emission of longer wavelengths, to the phosphor of the fluorescent discharge lamp among electric-discharge lamps.

As the phosphor which converts blue light in the visible range to longer wavelengths in the visible range, there are {[Chemical formula 3] $Y_3Al_5O_{12}$:Ce} which is cerium-activated garnet-based matrix, {[Chemical formula 4] $2SrO.(1-n)P_2O_5.nB_2O_3$:Eu} which is europium-activated borophosphate strontium-based matrix and {[Chemical formula 5]$3.5MgO.0.5MgF_2.GeO_2$:Mn} which is manganese-activated flurine germanate, and the conversion efficiency of [Chemical formula 3] reaches 80%.

Figure 24:
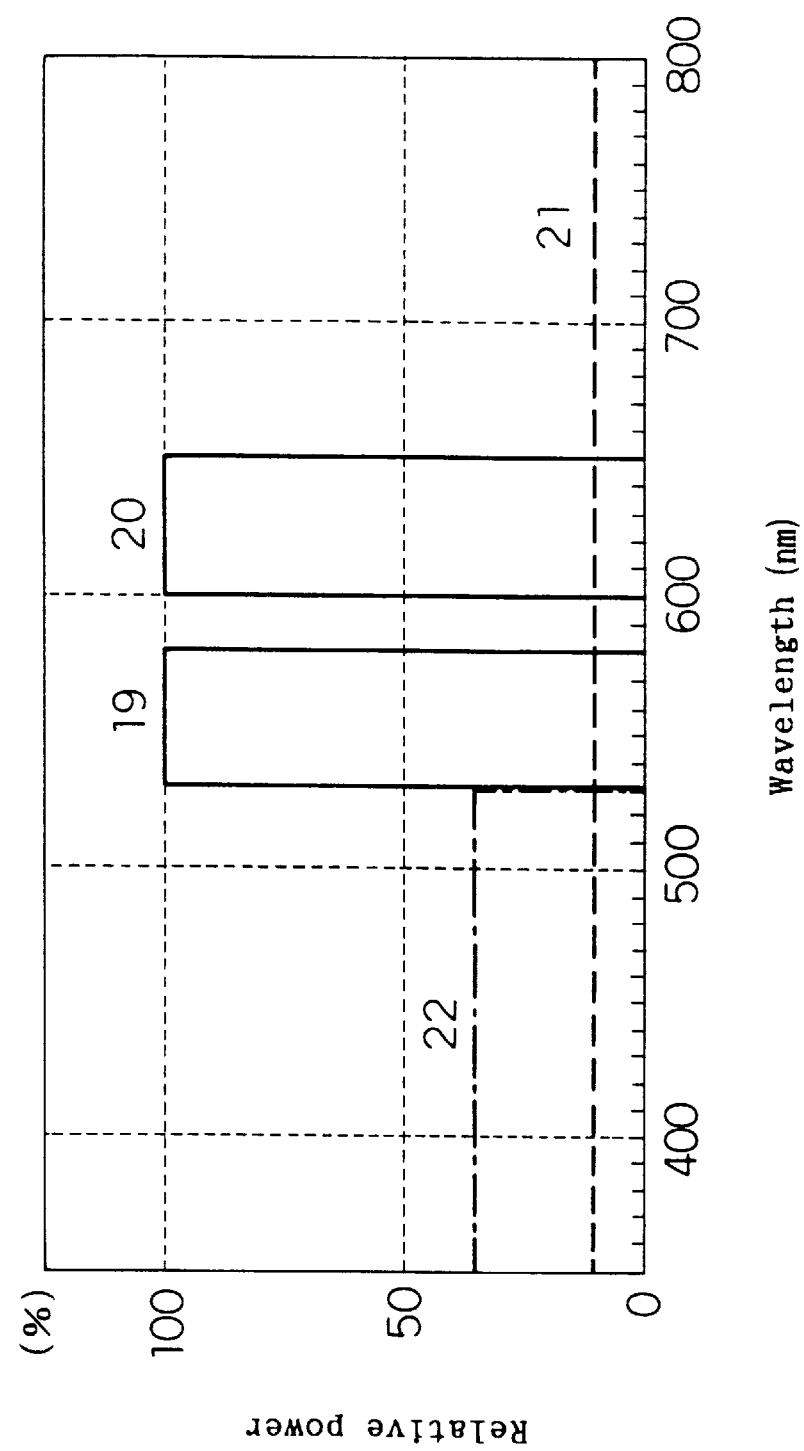
FIG. 24 is a schematic diagram of a spectral radiation range when a dual band radiation type light source is constructed as an ordinary illumination light source.
Figure 25A:
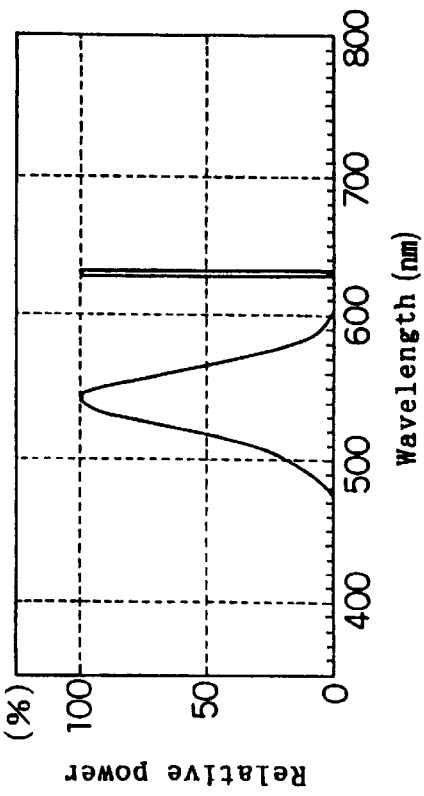
FIG. 25 is a comparison diagram of the fourth, fifth, sixth and seventh embodiments {(27) through (30)}.
Figure 25B:
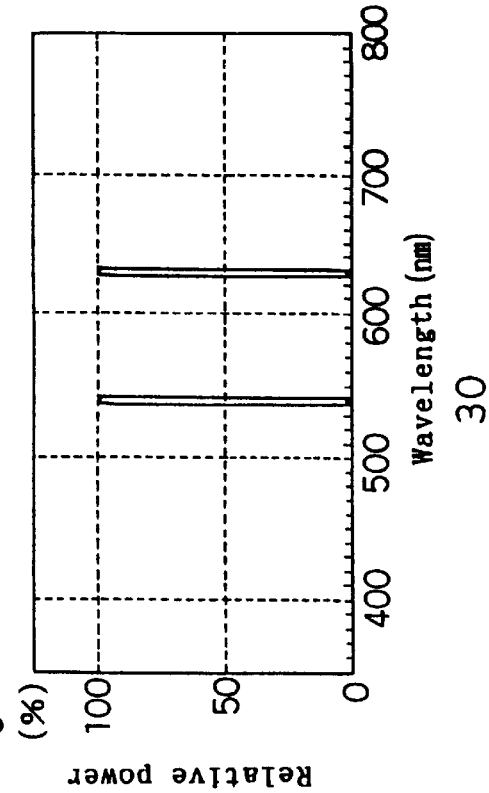
Figure 25C:
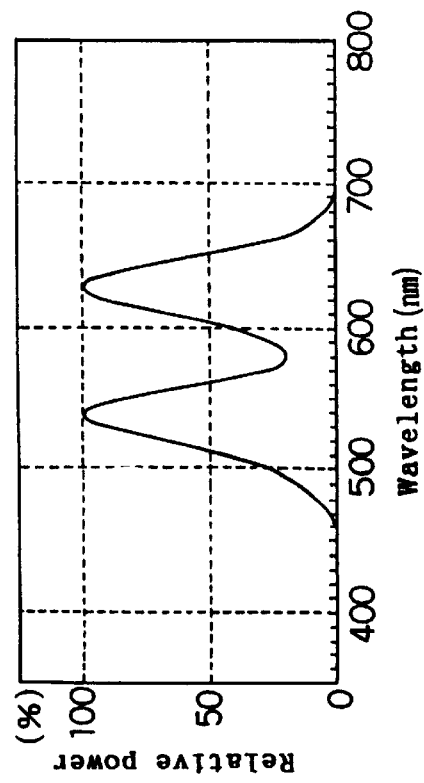
Figure 25D:
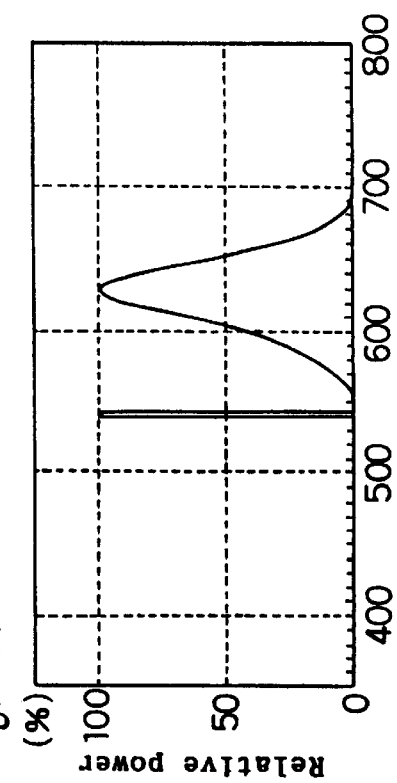

Now the third embodiment will be described below. FIG. 24 shows schematically the range of spectral emission in case a dual band radiation type light source is made as a lighting source for ordinary illumination. Solid line 19 schematically shows the range of spectral emission in wavelength band from 530 to 580 nm, and solid line 20 schematically shows the range of spectral emission in wavelength band from 600 to 650 nm. Broken line 21 schematically shows the proportion of spectral emission in other wavelengths of the visible radiation band, and dot and dash line 22 schematically shows the proportion of spectral emission at wavelength of blue not longer than 530 nm in the visible radiation band.

When making an electric-discharge lamp, it is ideal to concentrate the entire emission within the range of 19 and 20, although emission occurs at other wavelengths in the visible radiation band as indicated by 21. As the proportion of 21 increases, color rendering properties in the sense of accurate color rendering represented by Ra improves but the efficiency decreases.

When lamp light color is designed to be high correlated color temperature within the x-y chromaticity range of the present invention, emission in the range 22 is to be increased.

Setting the correlated color temperature at 4000 [K] or higher while concentrating the radiation in the wavelength ranges of 19 and 20 requires the total flux of the radiation in the range of 22 to be at least about 5% of the total flux of the radiation in the range of 19 and 20.

Therefore in embodiments of fluorescent lamp, blue phosphor such as [Chemical formula 11] $BaMg_2Al_{16}O_{27}$:Eu, [Chemical formula 12] $(Sr,Ca,Ba)_5(PO_4)_3Cl$:Eu, or [Chemical formula 13] $Sr_2Al_{14}O_{25}$:Eu, can be slightly included or in embodiment of HID lamp blue emitting material can be included.

Similar effect can also be obtained by making a light source which emits mainly in the wavelength range from 530 to 580 nm indicated by the solid line of 19 and a light source which emits mainly in the wavelength range from 600 to 650 nm indicated by the solid line of 20, and illuminating with mixed light thereof.

(27), (28), (29) and (30) of FIG. 25 show the fourth, fifth, sixth and seventh embodiments, respectively.

(a) which shows the fourth embodiment is a schematic diagram of spectral distribution in the case of a fluorescent lamp composed by a combination of a phosphor having emission peak in the range from 530 to 580 nm and a phosphor having emission peak in the range from 600 to 650 nm, both phosphors having large half-width.

(b) which shows the fifth embodiment is a schematic diagram of spectral distribution in the case of a fluorescent lamp composed by a combination of a phosphor having emission peak in the range from 530 to 580 nm with a large half-width and a phosphor having emission peak in the range from 600 to 650 nm with a small half-width.

(c) which shows the sixth embodiment is a schematic diagram of spectral distribution in the case of a fluorescent lamp composed by a combination of a phosphor having emission peak in the range from 530 to 580 nm with a small half-width and a phosphor having emission peak in the range from 600 to 650 nm with a large half-width.

(d) which shows the seventh embodiment is a schematic diagram of a spectral distribution in the case of a fluorescent lamp composed by a combination of a phosphor having emission peak in the range from 530 to 580 nm and a phosphor having emission peak in the range from 600 to 650 nm, both phosphors having small half-width.

Generally a lamp of higher efficiency with higher quantum efficiency of phosphor can be made by using a rare-earth element phosphor of smaller half-width. However, because a rare-earth element phosphor is expensive, the fluorescent lamp of the invention is made in the fourth embodiment with a combination of a self-activated phosphor, a $s^2$ electron configuration ion-activated phosphor and a Mn-activated phosphor and a combination of rare-earth element phosphors both having large half-width. In this case, however, the efficiency relatively decreases.

The fifth embodiment is a case of making a fluorescent lamp with a combination of a self-activated phosphor, a $s^2$ electron configuration ion-activated phosphor, a Mn-activated phosphor or a rare-earth element phosphor having large half-width being used for the phosphor having emission peak in the range from 530 to 580 nm and a rare-earth element phosphor having small half-width being used for the phosphor having emission peak in the range from 600 to 650 nm. In this case, because the wavelength band from 530 to 580 nm which greatly contributes to the efficiency is broad and the visual efficiency therein is high, the broad spectral distribution does not cause much decrease in the efficiency and therefore the range of choices from the material to make a practical light source becomes broader.

The sixth embodiment is, on the contrary, a case of making a fluorescent lamp with a combination of a self-activated phosphor, a $s^2$ electron configuration ion-activated phosphor, a Mn-activated phosphor or a rare-earth element phosphor having large half-width being used for the phosphor having emission peak in the range from 600 to 650 nm and a rare-earth element phosphor having small half-width being used for the phosphor having emission peak in the range from 530 to 580 nm. In this case, the range of choices for the material to emit in the range from 600 to 650 nm used to make a practical light source becomes broader. When using rare-earth element phosphor [Chemical formula 6] (Ce, Gd, Tb$^{3+}$) (Mg, Mn)B$_5$O$_{10}$ which has small half-width and emits green light and rare-earth element phosphor [Chemical formula 7] (Ce, Gd) (Mg, Mn$^{2+}$)B$_5$O$_{10}$ which has large half-width and emits red light, higher quantum efficiency can be obtained by turning these into a single phosphor activated with manganese and terbium rather than mixing them. By doing so, production process can be simplified because the R-G base dual band radiation type light source can be made from a single phosphor.

The seventh embodiment is a case where the fluorescent lamp of the invention is made by combining rare-earth element phosphors having small half-width of 30 nm or less.

In this case, many practical phosphors have high quantum efficiencies and a combination having the highest efficiency is made possible for realizing the invention.

For the rare-earth element phosphor having small half-width and high quantum efficiency, a phosphor activated with terbium, terbium-cerium or terbium-gadolinium-cerium having peak emission wavelength in the range from 530 to 580 nm or a phosphor activated with manganese, europium, samarium or praseodymium having peak emission wavelength in the range from 600 to 650 nm may be used.

Typical examples of such combination are the combination of [Chemical formula 1] and [Chemical formula 2] and the combination of [Chemical formula 6] and [Chemical formula 2]. A combination of a plurality of phosphors having peak emission wavelength in the range from 530 to 580 nm and a combination of a plurality of phosphors having peak emission wavelength in the range from 600 to 650 nm may also be used.

In case a phosphor which converts blue light in the visible range to longer wavelengths in the visible range is combined with one of the fourth through seventh embodiments, efficiency can be improved as blue emission lines of mercury at 405 nm and 436 nm are converted to longer wavelengths in the visible range.

A fluorescent lamp having light color within the range of chromaticity of the invention may also be made with less proportion of expensive rare-earth element phosphor, by mixing a rare-earth element phosphor having peak emission wavelength in the range from 530 to 580 nm, a rare-earth element phosphor having peak emission wavelength in the range from 600 to 650 nm and calcium halophosphate phosphor [Chemical formula 8] Ca$_5$(PO$_4$)3(F, Cl): Sb$^{3+}$, Mn$^{2+}$ which is an inexpensive and commonly used phosphor having broad emission band in the visible range.

In this case, emission efficiency of the lamp decreases as the proportions of [Chemical formula 1] and [Chemical formula 2] with respect to the rare-earth element phosphor, or more particularly the proportion of emission at wavelengths other than the main bands of emission from 530 to 580 nm and from 600 to 650 nm increase.

In the case of fluorescent mercury lamp or fluorescent type High Intensity Discharge lamps such as electrodeless fluorescent type discharge lamp, too, requirements for making the phosphor except for the emission lines of discharge gas are similarly set with the major wavelengths of emission in the ranges from 530 to 580 nm and from 600 to 650 nm. In case there is a strong electric-discharge emission line in the range, however, it can be used while adjusting the addition of the phosphor to achieve the chromaticity in the range of the invention.

In the case of metal halide lamp as an example of High Intensity Discharge lamp for ordinary illumination, the invention may be embodied by combining metal halides having major emission band in the ranges from 530 to 580 nm and from 600 to 650 nm. The same applies to the case of electrodeless discharge lamp.

The invention can be realized by increasing the amount of thallium-base metal halide sealed in a metal halide lamp used commonly as white light source.

While metal halide lamps in common use are based on In (blue emission)-Tl (green emission)-Na (yellow, red emission), the invention can be realized by combining sealed materials of thallium- and sodium-based metal halides (for example iodides of thallium and sodium) with the amount of In decreased to reduce the blue emission.

The invention may also be realized by combining compound [Chemical formula 9] NaI.AlCl$_3$ or [Chemical formula 10] CaI$_2$.AlCl$_3$ and a sealed material of thallium-based metal halide (for example thallium iodide).

The invention may also be realized by combining another common metal halide lamp, namely one based on Sc-Na-(Th), and a sealed material of thallium-based metal halide (for example thallium iodide).

the invention may also be realized by combining one based on Ce-Na-Cs(Sm) (for example iodides of these metals) with the amount of sealed Sm decreased to reduce blue emission and a sealed material of thallium-based metal halide (for example thallium iodide).

POSSIBILITY OF INDUSTRIAL USE

Applications of the invention include traffic lighting, street lighting, security lighting, lighting of automated factory, lighting of unfrequented public space and outdoor lighting where accurate color perception is not required and emphasis is placed on energy saving and economical efficiency.

As described above, the lamp of the invention has such an effect as being capable of realizing a high-efficiency light source while ensuring necessary level of categorical perception of a plurality of basic colors such as at least red, green, blue, yellow and white.

The invention is also capable of simplifying the lamp manufacturing process because the number of sealed light emitting materials is less in dual-wavelength type than in three-wavelength type.

What is claimed is:

1. A method for illuminating an object that allows categorical color perception of at least red, green, blue, yellow and white on the surface of the illuminated object, the method comprising:

illuminating the object with light consisting essentially of the combination of light of two major wavelength bands;

in which:
  the first wavelength band is from 530 to 580 nm; and
  the second wavelength band is from 600 to 650 nm.

2. The method of claim 1 in which the correlated color temperature resultant light color of the light is from 1700 to 6500 K and the DUV is from 0 to 70.

3. The method claim 1 in which the correlated color temperature resultant light color of the light is from 3500 to 4500 K and the DUV is from 10 to 45.

4. The method of claim 1 in which the light has a color in the range of x-y chromaticity coordinates enclosed by (x,y)= a: (0.228, 0.351) b: (0.358, 0.551), c: (0.525, 0.440), d: (0.453, 0.440), and e: (0.285, 0.332).

5. The method of claim 1 in which the luminous flux ratio of the intensity of light in the wavelength band from 530 to 580 nm to light in the wavelength band from 600 to 650 nm is within 1:2 to 10:1.

6. The method of any claims 1 to 5 in which the object is a road, a tunnel, or a traffic sign.

7. The method of any claims 1–5 in which the light is provided by a first light source that emits mainly in the wavelength range from 530 to 580 nm and a second light source that emits mainly in the wavelength range from 600 to 650 nm.

8. The method of any of claim 1–5 in which the light is provided by a single light source that has major light emitting bands in the wavelength ranges of from 530 to 580 nm and from 600 to 650 nm.

9. The method one of claims 1 to 5 in which the light is provided by a fluorescent lamp that comprises a rare-earth element phosphor that ha an emission peak in the range of from 530 to 580 nm and half-width of 30 nm or less, and a rare-earth phosphor that has an emission peak in the range of from 600 to 650 nm and half-width of 30 nm or less.

10. The method of claim 9 in which the phosphor that has an emission peak in the range of 530 to 580 nm is activated with terbium, terbium-cerium, or terbium-gadolinium-cerium.

11. The method of claim 9 in which the phosphor that has an emission peak at 600 to 650 nm and is activated with manganese, europium, samarium, or praseodymium.

12. The method of claim 11 in which the phosphor that has an emission peak at 600 to 650 nm is $(Ce,Gd)(Mg,Mn^{2+})B_5O_{10}$.

13. The method of claim 9 in which the phosphor that has an emission peak in the range of 530 to 580 nm is a $LaPO_4$:Ce, Tb phosphor and the phosphor that has a emission peak in the range of 600 to 650 nm is a $Y_2O_3$:Eu phosphor.

14. The method of claim 9 in which the light is provided by a fluorescent lamp that comprises a phosphor that absorbs blue emission and converts it to longer wavelengths.

15. The method of claim 9 in which the light is provided by a fluorescent lamp that comprises $Ca_5(PO_2)_3(F,Cl)$:$(Sb^{3+}Mn^{2+})$.

16. The method of claim 15 in which the light is provided by a fluorescent lamp that comprises a blue emitting phosphor selected from the group consisting of a $Mg_2Al_{16}O_{27}$:Eu, $(Sr,Ca,Ba)_5(PO_4)_3Cl$:Eu, and $Sr_2Al_{14}O_{25}$:Eu.

17. The method of claim 12 in which the light has a DUV of 14 to 70.

* * * * *

UNITED STATES PATENT AND TRADEMARK OFFICE
CERTIFICATE OF CORRECTION

PATENT NO. : 6,153,971
DATED : November 28, 2000
INVENTOR(S) : Shimizu et al.

It is certified that error appears in the above-identified patent and that said Letters Patent is hereby corrected as shown below:

<u>Title page, item [56],</u>
References Cited, U.S. Patent Documents, "4,038,204  7/1977  Wachte" should read
-- 4,038,204  7/1977  Wachtel --.

<u>Column 22,</u>
Line 5, delete "ha" and insert -- has --.

Signed and Sealed this

Second Day of October, 2001

*Attest:*

*Attesting Officer*

NICHOLAS P. GODICI
*Acting Director of the United States Patent and Trademark Office*